US008423232B2

(12) United States Patent
Tsutsumi et al.

(10) Patent No.: US 8,423,232 B2
(45) Date of Patent: Apr. 16, 2013

(54) VEHICLE CONTROL DEVICE

(75) Inventors: Takahiko Tsutsumi, Toyota (JP);
Takashi Inoue, Nisshin (JP); Ichiro Kitaori, Nagoya (JP); Kazuo Kawaguchi, Kasugai (JP); Takashi Yuma, Toyokawa (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 190 days.

(21) Appl. No.: 12/994,671

(22) PCT Filed: Apr. 20, 2009

(86) PCT No.: PCT/JP2009/057881
§ 371 (c)(1),
(2), (4) Date: Nov. 24, 2010

(87) PCT Pub. No.: WO2009/145014
PCT Pub. Date: Dec. 3, 2009

(65) Prior Publication Data
US 2011/0098881 A1    Apr. 28, 2011

(30) Foreign Application Priority Data

May 26, 2008 (JP) .................................. 2008-137180

(51) Int. Cl.
*G01M 17/00* (2006.01)
(52) U.S. Cl.
USPC ............................................ 701/29.7; 477/34
(58) Field of Classification Search .................... 701/62, 701/63, 64, 95, 29.7, 34; 477/107, 34
See application file for complete search history.

(56) References Cited

U.S. PATENT DOCUMENTS

| | | | | |
|---|---|---|---|---|
| 6,401,899 B1 * | 6/2002 | Kanehisa et al. | ........... | 192/219.5 |
| 6,561,950 B1 * | 5/2003 | Ohtsuka | ......................... | 477/124 |
| 6,741,917 B2 * | 5/2004 | Tomikawa | ....................... | 701/22 |
| 6,866,611 B2 * | 3/2005 | Tsuzuki et al. | ................... | 477/97 |
| 6,905,181 B2 * | 6/2005 | Iwagawa et al. | ............... | 303/155 |
| 7,810,627 B2 * | 10/2010 | Saitoh | ......................... | 192/219.5 |
| 2004/0053743 A1 | 3/2004 | Tsuzuki et al. | | |
| 2004/0147366 A1 * | 7/2004 | Aoki et al. | ......................... | 477/6 |
| 2007/0179018 A1 | 8/2007 | Endo et al. | | |
| 2007/0225117 A1 * | 9/2007 | Shimizu et al. | ................ | 477/182 |

(Continued)

FOREIGN PATENT DOCUMENTS

| | | |
|---|---|---|
| EP | 2149472 A1 | 2/2010 |
| JP | 2976688 A | 10/1993 |

(Continued)

*Primary Examiner* — Thomas Black
*Assistant Examiner* — Shardul Patel
(74) *Attorney, Agent, or Firm* — Sughrue Mion, PLLC

(57) ABSTRACT

A vehicle control device includes: an abnormality detecting portion that detects an abnormality in at least part of a shift position detection portion detecting a shift position; a shift-operatoin determining portion that determines, based on a detection signal from the shift position detection portion, whether a shift operating device is shift-operated or not by a driver, and a vehicle movement prevention control portion that, in a case where a movement of a vehicle is prevented by an actuator and in a case where the abnormality in part of the shift position detection portion is detected by the abnormality detecting portion, permits the actuator to release the prevention of the movement of the vehicle if it is determined by the shift-operation determining portion that the shift operating device is shift-operated by the driver.

5 Claims, 15 Drawing Sheets

U.S. PATENT DOCUMENTS

| | | |
|---|---|---|
| 2007/0272511 A1 | 11/2007 | Saitoh |
| 2007/0281827 A1* | 12/2007 | Shimizu et al. ............... 477/92 |
| 2010/0168956 A1 | 7/2010 | Ueno |

FOREIGN PATENT DOCUMENTS

| | | |
|---|---|---|
| JP | 2001-304390 A | 10/2001 |
| JP | 2003-65436 A1 | 3/2003 |
| JP | 2003-130210 A | 5/2003 |
| JP | 2004-52819 A | 2/2004 |
| JP | 2007-147057 A | 6/2007 |
| JP | 2007-205371 A | 8/2007 |
| JP | 2007-315410 A | 12/2007 |
| JP | 2008-290622 A | 12/2008 |

* cited by examiner

| SHIFT POSITION | N POSITION | R POSITION | D POSITION | M POSITION | B POSITION |
|---|---|---|---|---|---|
| DETECTION SIGNAL VOLTAGE $V_{SF}$ FROM SHIFT SENSOR | mid | high | low | mid | low |
| DETECTION SIGNAL VOLTAGE $V_{SF}$ FROM SHIFT SENSOR | high | high | high | low | low |

| ACTUAL SHIFT POSITION | N POSITION | R POSITION | D POSITION | M POSITION | B POSITION |
|---|---|---|---|---|---|
| [1] WHEN NORMAL (ORDINARY) (WHEN [2] TO [5] BELOW NOT SATISFIED) | N | R | D | M | B |
| [2] WHEN SHIFT SENSOR FAILS AND WHEN SELECT SENSOR NOT FAIL (xfsft=ON AND xfslct=OFF) | N | N | N (WHEN OPERATED FROM M OR B POSITION) | M | M |
| [3] WHEN SELECT SENSOR FAILS AND WHEN SELECT SENSOR FAIL-SAFE DISABLED (xfslct=ON AND xslctflsfen=OFF) | M | M | B | M | B |
| [4] WHEN SELECT SENSOR FAILS AND WHEN SELECT SENSOR FAIL-SAFE ENABLED (xfslct=ON AND xslctflsfen=ON) | M | N | N | M | N |
| [5] WHEN SHIFT SENSOR FAILS AND WHEN SELECT SENSOR FAILS (xfsft=ON AND xfslct=ON) | M | M | M | M | M |

FIG.10

VEHICLE CONTROL DEVICE

TECHNICAL FIELD

The present invention relates to a shift-by-wire technology for a vehicle.

BACKGROUND ART

A vehicle control device employing a so-called shift-by-wire (SBW) has hitherto been known in an automatic transmission for a vehicle. The vehicle control device detects a shift position of a shift operating device by a sensor included in the shift operating device to determine a shift range corresponding to the shift position detected. Corresponding to the shift range determined, the vehicle control device then outputs a control signal to the automatic transmission, etc. Specifically, if the shift range determined based on a detection signal from the sensor is a driving range, then the vehicle control device outputs a control signal for gear change corresponding to the driving range to the automatic transmission to thereby execute a gear change of the automatic transmission, whereas if the determined shift range is a parking range (P range), then it outputs a control signal to a parking lock mechanism for mechanically stopping drive wheels from rotating to activate the parking lock mechanism to thereby perform a parking lock for preventing the rotation of the drive wheels. For example, a vehicle control device described in Patent Document 1 is the vehicle control device employing the shift-by-wire.

A vehicle described in Patent Document 1 includes a range switching device having the shift operating device and an electric motor driven in conjunction with a shift operation of the shift operating device; and the automatic transmission that changes gears under hydraulic control. The vehicle control device described in Patent Document 1 detects a shift range indicated by the range switching device from a position detection sensor included in the range switching device and detects a shift range indicated by the automatic transmission from a hydraulic detection sensor included in the automatic transmission. If detection results obtained from the position detection sensor and the hydraulic detection sensor do not coincide with each other, then the controller executes a preset fail-safe processing since at least one of the position detection sensor and the hydraulic detection sensor is considered to have an abnormality (failure, fail). The fail-safe process includes for example warning an operator by use of a buzzer, a lamp, etc. and switching the driving range to P range under certain conditions.

PRIOR ART DOCUMENTS

Patent Documents

Patent Document 1: Japanese Laid-Open Patent Publication No. 2004-52819
Patent Document 2: Japanese Patent Publication No. 2976688

SUMMARY OF THE INVENTION

Problem to Be Solved by the Invention

In a case where the detection results obtained from the position detection sensor and the hydraulic detection sensor do not coincide with each other, that is, where an abnormality (failure, fail) is found in the shift-by-wire control system, the vehicle control device described in Patent Document 1 executes the fail-safe processing such as switching the driving range to P range as described above. However, though a parking lock is effected by the parking lock mechanism when the fail-safe processing is executed to switch the driving range to P range, Patent Document 1 does not refer to a means for releasing the parking lock of a vehicle having an abnormality in the control system. Therefore, the controller described in Patent Document 1 may experience an inconvenience that movement of the vehicle is limited due to the unreleased parking lock when the parking lock is applied to the vehicle having an abnormality in the control system. This problem is still unknown.

The present invention was conceived in view of the above circumstances as background, and its object is to provide a control device capable of releasing a limitation of vehicle movement when an abnormality occurs in a control system of a vehicle having an actuator operable to limit the vehicle movement based on a control signal.

Means for Solving the Problem

The object indicated above may be achieved according to a first aspect of the invention, which provides (a) a vehicle control device having an actuator operative to prevent a movement of a vehicle and a shift operating device including a shift position detection means detecting a shift position, the vehicle control device outputting, when the shift operating device is shift-operated to a predetermined shift position to release prevention of the movement of the vehicle, a control signal for permitting the actuator to release the prevention of the movement of the vehicle, the vehicle control device including: (b) an abnormality detecting means that detects an abnormality in at least part of the shift position detection means; (c) a shift-operation determining means that determines, based on a detection signal from the shift position detection means, whether the shift operating device is shift-operated or not by a driver; (d) a vehicle movement prevention control means that, in a case where the movement of the vehicle is prevented by the actuator and in a case where the abnormality in part of the shift position detection means is detected by the abnormality detecting means, permits the actuator to release the prevention of the movement of the vehicle if it is determined by the shift-operation determining means that the shift operating device is shift-operated by the driver, and (e) the shift-operation determining means determines that the shift operating device is shift-operated by the driver if the shift position changes from a predefined pre-operation position to a position other than the pre-operation position after the abnormality in part of the shift position detection means is detected by the abnormality detection means.

The object indicated above may be achieved according to a second aspect of the invention, which provides the vehicle control device of the first aspect of the invention, wherein the actuator is a parking lock mechanism that mechanically stops rotation of drive wheels.

The object indicated above may be achieved according to a fourth aspect of the invention, which provides the vehicle control device of any one of the first to third aspects of the invention, wherein (a) in a case where all of the shift position detection means is normal, if a stay time at the shift position for a neutral range reaches or exceeds a predetermined neutral range settling time, then switching is made to the neutral range, and wherein (b) the vehicle movement prevention control means permits the actuator to release the prevention of the movement of the vehicle if a predetermined time shorter than the predetermined neutral range settling time has elapsed from a time when the shift operating device is shift-operated by the driver.

The object indicated above may be achieved according to a fifth aspect of the invention, which provides the vehicle control device of the fourth aspect of the invention, wherein in a case where the shift position detection means determined to be abnormal by the abnormality detecting means returns to normal before the elapse of the predetermined time from the time when the shift operating device is shift-operated by the driver, the vehicle movement prevention control means permits the actuator to release the prevention of the movement of the vehicle if the shift position detected by the shift position detection means is a predetermined shift position to release the prevention of the movement of the vehicle.

The object indicated above may be achieved according to a sixth aspect of the invention, which provides the vehicle control device of the fourth aspect of the invention, wherein in a case where the shift position detection means determined to be abnormal by the abnormality detecting means returns to normal before elapse of the predetermined time from the time when the shift operating device is shift-operated by the driver, the vehicle movement prevention control means does not permit the actuator to release the prevention of the movement of the vehicle until the shift operating device is again shift-operated by the driver.

The object indicated above may be achieved according to a seventh aspect of the invention, which provides the vehicle control device of any one of the first to sixth aspects of the invention, wherein (a) the shift operating device is two-dimensionally shift-operated in a first direction and a second direction intersecting with the first direction, wherein (b) the shift position detection means includes a first-direction detection means that detects a shift operation in the first direction and a second-direction detection means that detects a shift operation in the second direction, wherein (c) the case where an abnormality in part of the shift position detection means is detected by the abnormality detecting means refers to a case where an abnormality in either one of the first-direction detection means and the second-direction detection means is detected by the abnormality detecting means, and wherein (d) the shift-operation determining means determines whether the shift operating device is shift-operated by the driver or not, based on a detection signal from the other that is not abnormal of the first-direction detection means and the second-direction detection means.

The object indicated above may be achieved according to a eighth aspect of the invention, which provides the vehicle control device of the seventh aspect of the invention, wherein (a) the first-direction detection means and the second-direction detection means are position sensors, respectively, for detecting the shift position, and wherein (b) the abnormality detecting means determines that the first-direction detection means and the second-direction detection means are respectively abnormal if voltages of their respective detection signals fall outside their respective predefined voltage variation ranges.

Effect of the Invention

According to the vehicle control device of the invention as defined in the first aspect of the invention, the vehicle control device includes: (a) an abnormality detecting means that detects an abnormality in at least part of the shift position detection means; (b) a shift-operation determining means that determines, based on a detection signal from the shift position detection means, whether the shift operating device is shift-operated or not by a driver; and (c) a vehicle movement prevention control means that, in a case where the movement of the vehicle is prevented by the actuator and in a case where the abnormality in part of the shift position detection means is detected by the abnormality detecting means, permits the actuator to release the prevention of the movement of the vehicle if it is determined by the shift-operation determining means that the shift operating device is shift-operated by the driver. Accordingly, it is thus possible for the driver to release the vehicle movement prevention effected by the actuator even when a part of the shift position detection means becomes abnormal that are included in the shift-by-wire control system making up the intervention between the shift operating device and the actuator. Furthermore, the vehicle movement prevention is not released until the shift-operation determining means determines that the shift operating device is shift-operated by the driver even though the shift operating device is shift-operated to the predetermined shift position at which the vehicle movement prevention is released when the part of the shift position detection means is abnormal, thereby obviating a release of the vehicle movement prevention against the driver's intention. The actuator is, for instance, the parking lock mechanism or a parking brake for braking drive wheels in accordance with an electric control signal. And (e) the shift-operation determining means determines that the shift operating device is shift-operated by the driver if the shift position changes from the predefined pre-operation position to the other position after the detection by the abnormality detecting means of an abnormality in part of the shift position detection means, so that it is possible to make an easy determination of whether the shift operating device is shift-operated by the driver or not. Furthermore, the vehicle movement prevention is not released as long as the shift position stays at a position other than the pre-operation position previous to the detection of an abnormality in part of the shift position detection mean, whereupon the vehicle movement prevention is not released when it is unknown whether the stay of the shift position at the position other than the pre-operation position is due to the driver's intention or not, thereby obviating a release of the vehicle movement prevention against the diver's intention.

According to the vehicle control device of the invention as defined in the second aspect of the invention, the actuator is a parking lock mechanism that mechanically stops rotation of drive wheels. Accordingly, when the parking lock caused by the parking lock mechanism for mechanically stopping the rotation of the drive wheels, is in action, even if the part of the shift position detection means is abnormal, the parking lock is released due to shift operation by the driver.

According to the vehicle control device of the invention as defined in the fourth aspect of the invention, the vehicle movement prevention control means permits the actuator to release the prevention of the movement of the vehicle if a predetermined time shorter than the predetermined neutral range settling time has elapsed from a time when the shift operating device is shift-operated by the driver. Accordingly, the vehicle movement prevention is released also when the shift operation is performed by the driver without driver's intention to place the shift range in the neutral range but with driver's intention to place it in the other shift range allowing the release of the vehicle movement prevention than the neutral range.

According to the vehicle control device of the invention as defined in the fifth aspect of the invention, when the shift position detection means determined to be abnormal by the abnormality detecting means returns to normal before the elapse of the predetermined time from the time of the driver's shift operation of the shift operating device, the vehicle movement prevention control means permits the actuator to release the vehicle movement prevention if the shift position detected by the shift position detection means is a predetermined shift position to release the vehicle movement prevention, thereby making it possible to release the vehicle movement prevention along the driver's intention when the shift position detection means returns to normal.

According to the vehicle control device of the invention as defined in the sixth aspect of the invention, in a case where the shift position detection means determined to be abnormal by the abnormality detecting means returns to normal before elapse of the predetermined time from the time when the shift operating device is shift-operated by the driver, the vehicle movement prevention control means does not permit the actuator to release the prevention of the movement of the vehicle until the shift operating device is again shift-operated by the driver. Accordingly, the actuator can work not based on the shift operation performed when the shift position detection means is abnormal, but based on the shift operation performed after its returning to normal, thereby achieving a release of the prevention of the movement of the vehicle along the driver's intention more faithfully.

According to the vehicle control device of the invention as defined in the seventh aspect of the invention, (a) the shift operating device is two-dimensionally shift-operated in a first direction and a second direction intersecting with the first direction; (b) the shift position detection means includes a first-direction detection means that detects a shift operation in the first direction and a second-direction detection means that detects a shift operation in the second direction; (c) the case where an abnormality in part of the shift position detection means is detected by the abnormality detecting means refers to a case where an abnormality in either one of the first-direction detection means and the second-direction detection means is detected by the abnormality detecting means; and (d) the shift-operation determining means determines whether the shift operating device is shift-operated by the driver or not, based on a detection signal from the other that is not abnormal (that is normal) of the first-direction detection means and the second-direction detection means. Hence, even though one of the first-direction detection means and the second-direction detection means goes abnormal, there is a case where it can be determined whether the shift operation is made by the driver or not from a change in the shift position detected by the other that is normal. In such a case, it is possible to release the vehicle movement prevention based on the driver's shift operation.

According to the vehicle control device of the invention as defined in the eighth aspect of the invention, (a) the first-direction detection means and the second-direction detection means are position sensors, respectively, for detecting the shift position; and (b) the abnormality detecting means determines that the first-direction detection means and the second-direction detection means are respectively abnormal if voltages of their respective detection signals fall outside their respective predefined voltage variation ranges, whereupon it can objectively and simply be determined whether the first-direction detection means and the second-direction detection means are respectively abnormal or not.

Preferably, in a case where the movement of the vehicle is prevented by the actuator and in a case where the abnormality in part of the shift position detection means is detected by the abnormality detecting means, if it is determined by the shift-operation determining means that the shift operating device is shift-operated by the driver, the shift range is placed in the neutral range. The neutral range is the non-running range in which the parking lock is released with the power transmission path interrupted between the drive power source and the drive wheels. Therefore, since the shift range is in the neutral range, the drive wheels cannot be driven in the above-indicated case, thereby achieving an improvement in safety of the shift operation.

BRIEF DESCRIPTION OF THE DRAWINGS

FIG. 10 is a table for explaining shift positions $P_{SH}$ recognized by the electronic control device of FIG. 3 when the shift range is P range in the power transmission device for vehicle of FIG. 1.

MODES FOR CARRYING OUT THE INVENTION

Embodiments of the present invention will now be described in detail with reference to the drawings.

First Embodiment

Figure 1:
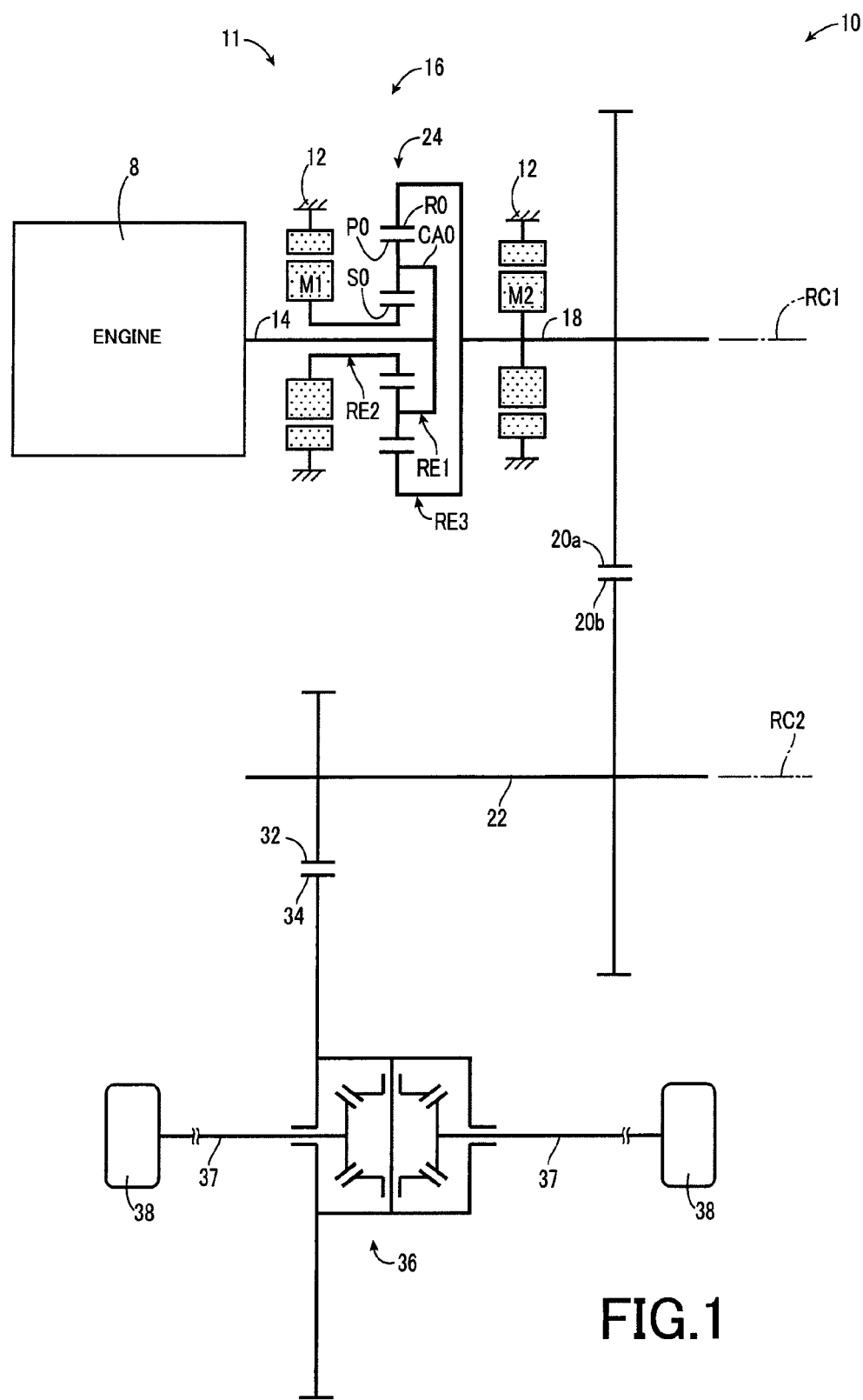
FIG. 1 is a diagrammatic view for explaining a power transmission device for vehicle to which a control device of the present invention is applied.

FIG. 1 is a diagrammatic view for explaining a power transmission device for vehicle 10 (hereinafter, represented as "power transmission device 10") to which a control device of the present invention is applied. Although a vehicle to which the control device of the present invention is applied may be any type of vehicle such as a normal engine vehicle, a hybrid vehicle, and an electric-powered vehicle, following description is given of an example where the control device of the present invention is applied to the power transmission device 10 advantageously used in the hybrid vehicle. Referring to FIG. 1, the power transmission device 10 includes, sequentially arranged on a first axis RC1 within a transmission case 12 (hereinafter, represented as "case 12") in the form of a non-rotating member fitted to a vehicle body, an input shaft 14 serving as an input rotary member; a differential portion 11 serving as a continuously variable transmission portion coupled directly or indirectly via a pulsing motion absorbing damper (vibration attenuator) not shown, etc. to the input shaft 14; and a transmitting member 18 that is an output rotary member of the differential portion 11; and includes a counter gear pair 20a and 20b coupled to the transmitting member 18 to make up part of a power transmission path between the differential portion 11 and drive wheels 38, the counter gear pair 20a and 20b providing a power-transmittable coupling between the first axis RC1 and a second axis RC2 parallel to the first axis RC1; and an output shaft 22 that is a countershaft serving as an output rotary member of the power transmission device 10, the output shaft 22 disposed on the second axis RC2 and coupled to the output-side gear 20b of the counter gear pair 20a and 20b. This power transmission device 10 is conveniently used in an FF (Front engine Front drive) type vehicle where it is transversely mounted. The power transmission device 10 transmits a power derived from an engine 8 that is an internal combustion engine such as e.g., a gasoline engine or a diesel engine acting as a running drive-power source coupled directly or substantially directly via the pulsing motion absorbing damper not shown to the input shaft 14, by way of a differential drive gear 32 coupled to the output shaft 22 on the second axis RC2, a differential gear (final reduction gear) 36 having a differential ring gear 34 engaged with the differential drive gear 32, and a pair of axles 37 in sequence to the left and right drive wheels 38.

The differential portion 11 includes a first motor M1; a power distribution mechanism 16 that is a mechanical system for mechanically distributing an output of the engine 8 input to the input shaft 14, the power distribution mechanism 16 serving as a differential mechanism for distributing the output of the engine 8 to the first motor M1 and the transmitting member 18; and a second motor M2 operatively coupled to the transmitting member 18 so as to be integrally rotated therewith. The first motor M1 and the second motor M2 of this embodiment are so-called motor generators also having a power generation function. The first motor M1 and the second motor M2 function as generators (electric generators) to generate a reaction force torque acting in such a direction as to reduce absolute values of rotational speeds of the motors M1 and M2.

The power distribution mechanism 16 includes as its main element a differential portion planetary gearing 24 of a single pinion type having a predetermined gear ratio p0. This differential portion planetary gearing 24 includes as its rotary elements a differential portion sun gear S0; a differential portion planet gear P0; a differential portion carrier CA0 for supporting the differential portion planet gear P0 in a rotatable and revolvable manner; and a differential portion ring gear R0 engaged via the differential portion planet gear P0 with the differential gear sun gear S0. When the numbers of teeth of the differential portion sun gear S0 and the differential portion ring gear R0 are represented as ZS0 and ZR0, respectively, the gear ratio p0 is ZS0/ZR0.

In this power distribution mechanism 16, the differential portion carrier CA0 is coupled to the input shaft 14, i.e., to the engine 8; the differential portion sun gear S0 is coupled to the first motor M1; and the differential portion ring gear R0 is coupled to the transmitting member 18. The power distribution mechanism 16 configured in this manner is put in a differential state where a differential action is operable, i.e., the differential action works since relative rotations are possible among the differential portion sun gear S0, the differential portion carrier C and the differential ring gear R0 that are three elements of the differential portion planetary gearing 24, with the result that an output of the engine 8 is distributed to the first motor M1 and the transmitting member 18; it is stored with an electric energy generated from the first motor M1 by part of the distributed output of the engine 8; and the second motor M2 is rotationally driven. Thus, the differential portion 11 (the power distribution mechanism 16) is allowed to function as an electrical differential gear, and for example the differential portion 11 is put in a so-called continuously variable transmission state (electrical CVT state) so that the rotation of the transmitting member 18 is continuously varied irrespective of the predetermined rotation of the engine 8. That is, the differential portion 11 functions as an electrical continuously variable transmission whose change gear ratio $\gamma 0$ (rotational speed $N_{IN}$ of the input shaft 14/rotational speed $N_{18}$ of the transmitting member 18) is continuously varied from a minimum value $\gamma 0min$ to a maximum value $\gamma 0max$. By controlling operational states of the first motor M1 and the second motor M2 coupled power-transmittably to the power distribution mechanism 16 (differential portion 11) in this manner, control is provided of a differential state of the power distribution mechanism 16, i.e., a differential state between the rotational speed of the input shaft 14 and the rotational speed of the transmitting member 18. Furthermore, the first motor M1 is put in a freely-rotatable state so as to interrupt a power transmission from the engine 8 to the drive wheels 38.

Figure 2:
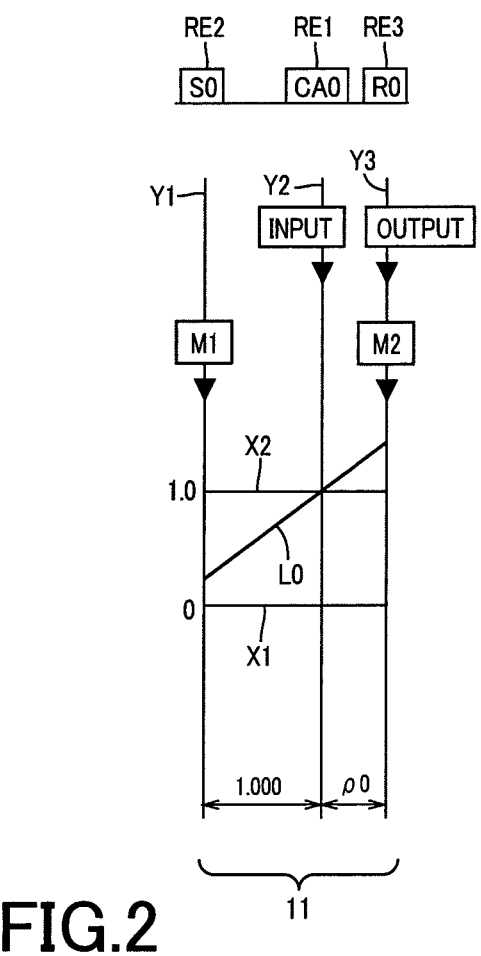
FIG. 2 is a nomogram capable of representing, on straight lines, relative relationships among the rotational speeds of the rotary elements in the power transmission device for vehicle of FIG. 1.

FIG. 2 is a nomogram capable of representing, on straight lines, relative relationships among the rotational speeds of the rotary elements in the power transmission device 10. The nomogram of FIG. 2 is two-dimensional coordinates having a horizontal axis indicative of relationships of the gear ratio p0 of the differential portion planetary gearing 24 and a vertical axis indicative of the relative rotational speeds, with a horizontal line X1 representing a rotational speed of zero, and a horizontal line X2 representing a rotational speed "1.0", namely, a rotational speed $N_E$ of the engine 8 coupled to the input shaft 14.

Three vertical lines Y1, Y2, and Y3 corresponding to the three elements of the power distribution mechanism 16 making up the differential portion 11 represent relative rotational speeds, respectively, of the differential portion sun gear S0 corresponding to a second rotary element (second element) RE2, of the differential portion carrier CA0 corresponding to a first rotary element (first element) RE1, and of the differential portion ring gear R0 corresponding to a third rotary element (third element) RE3 in the order from left, with their intervals being defined depending on the gear ratio p0 of the differential portion planetary gearing 24. In more detail, when the interval between the sun gear and the carrier is an interval corresponding to "1" in a relationship between the vertical lines of the nomogram, the interval between the carrier and the ring gear is an interval corresponding to the gear ratio p0 of the planetary gearing. That is, in the differential portion 11, the vertical-line interval between the vertical lines Y1 and Y2 is set to an interval corresponding to "1", while the interval between the vertical lines Y2 and Y3 is set to an interval corresponding to the gear ratio p0.

When represented using the nomogram of FIG. 2, the power transmission device 10 of this embodiment is configured such that, in the power distribution mechanism 16 (differential portion 11), the first rotary element RE1 (differential portion carrier CA0) of the differential portion planetary gearing 24 is coupled to the input shaft 14, i.e., the engine 8; that the second rotary element RE2 thereof is coupled to the first motor M1; and that the third rotary element RE3 (differential portion ring gear R0) thereof is coupled to the transmitting member 18 and the second motor M2, to thereby transmit the rotation of the input shaft 14 via the transmitting member 18 to the drive wheels 38. At that time, a diagonal straight line L0 through the intersection of Y2 and X2 represents a relationship between the rotational speed of the differential portion sun gear S0 and the rotational speed of the differential portion ring gear R0.

For example, in the differential portion 11, the first rotary element RE1 to the third rotary element RE3 are put in differential states where they are mutually relatively rotatable, so that if the rotational speed of the differential portion ring gear R0 represented by the intersection of the straight line L0 and the vertical line Y3 is constrained by a vehicle speed V to be substantially constant, then the rotary speed of the differential portion sun gear S0 represented by the intersection of the straight line L0 and the vertical line Y1, i.e., the rotational speed of the first motor M1 rises or falls when the rotational speed of the differential portion carrier CA0 represented by the intersection of the straight line L0 and the vertical line Y2 is increased or reduced through the control of the engine rotational speed $N_E$.

Figure 3:
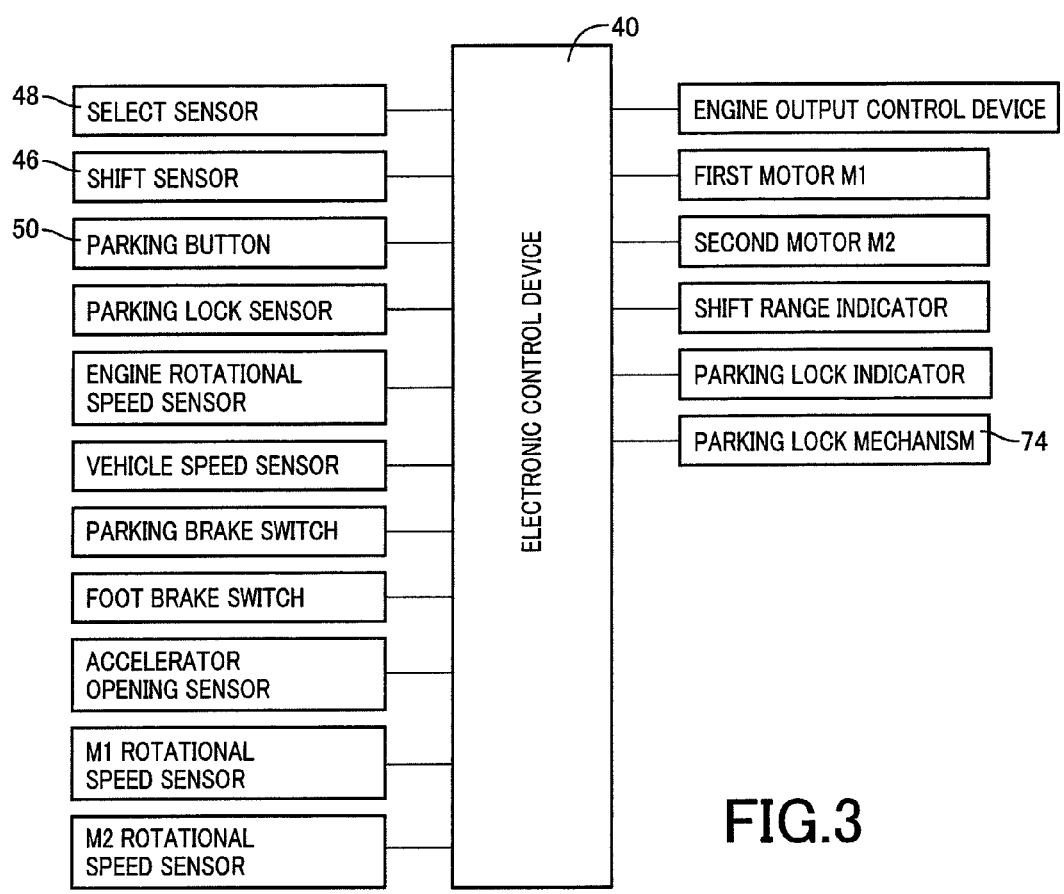
FIG. 3 is a diagram exemplifying input/output signals to/from an electronic control device for controlling the power transmission device for vehicle of FIG. 1.

FIG. 3 exemplifies signals input to and output from an electronic control device 40 for controlling the power transmission device 10 of this embodiment. This control device 40 is configured to include a so-called microcomputer having a CPU, a ROM, a RAM, an input/output interface, etc. and executes a drive control such as a hybrid drive control related to the engine 8 and the first and second motors M1 and M2 by performing signal processing in accordance with a program previously stored in the ROM while utilizing a temporary storage function of the RAM. Furthermore, since the power transmission device 10 of this embodiment employs a so-called shift-by-wire, the electronic control device 40 functions also as a vehicle controller for controlling the shift range switching in the shift-by-wire.

From sensors, switches, etc. as depicted in FIG. 3, the electronic control device 40 is fed with their respective signals, that is, detection signals from a shift sensor 46 and a select sensor 48 that are position sensors for detecting a shift position $P_{SH}$ of a shift lever 44 (see FIG. 4), a signal indicative of an operation of a parking button 50 (see FIG. 4), a signal indicative of a parking lock state in a parking lock mechanism 74 (see FIG. 8), a signal indicative of the engine rotation speed $N_E$ that is a rotational speed of the engine 8, a signal indicative of the vehicle speed V corresponding to a rotational speed $N_{OUT}$ of the output shaft 22 (hereinafter, represented as "output shaft rotational speed $N_{OUT}$"), a signal indicative of a parking brake operation, a signal indicative of a foot brake operation, a signal indicative of an accelerator opening $A_{CC}$ that is an operation amount of an accelerator pedal corresponding to an output amount required by the driver, a signal indicative of a rotational speed $N_{M1}$ of the first motor M1 (hereinafter, represented as "first motor rotational speed $N_{M1}$"), a signal indicative of a rotational speed $N_{M2}$ of the second motor M2 (hereinafter, represented as "second motor rotational speed $N_{M2}$"), etc.

From the electronic control device 40, signals are output such as a control signal to an engine output control device that controls the engine output, command signals for commanding activations of the motors M1 and M2, a shift range indication signal for activating a shift range indicator (shift range display device), a parking lock indication signal for activating an indicator that indicates the parking lock state, and a command signal for commanding the activation of the parking lock mechanism 74.

Figure 4:
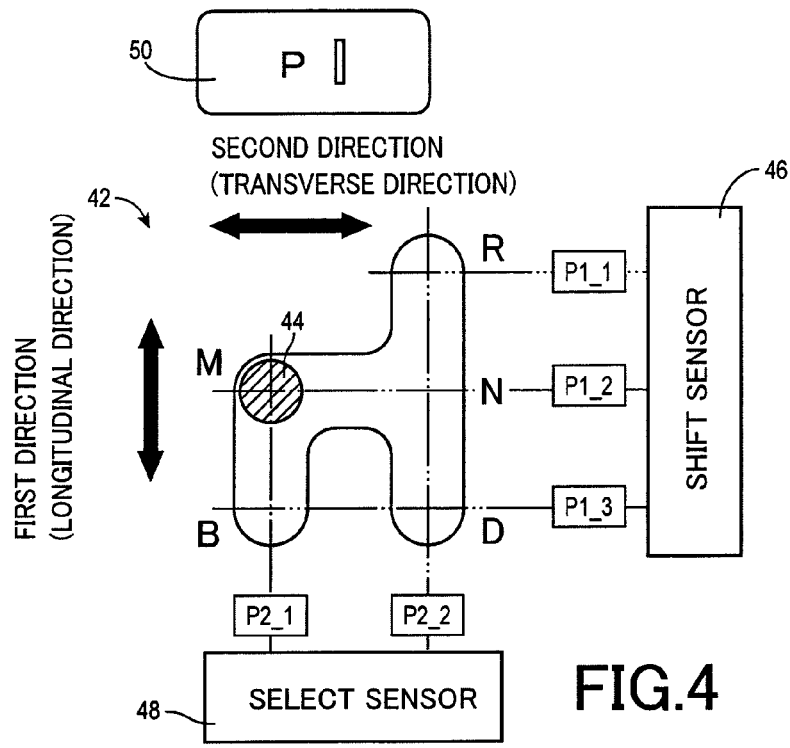
FIG. 4 is a diagram depicting an example of a shift operating device acting as a switching device that switches a plurality of shift ranges by intentional operations in the power transmission device for vehicle of FIG. 1.

FIG. 4 is a diagram depicting an example of a shift operating device 42 acting as a switching device that switches a plurality of shift ranges by intentional operations in the power transmission device 10. This shift operating device 42 is disposed in the vicinity of the driver's seat and includes a shift lever 44 that is operated to a plurality of shift positions $P_{SH}$.

The shift lever 44 is allowed to be operated, as depicted in FIG. 4, to R position, N position, and D position that are three shift positions $P_{SH}$ arranged in a front-to-rear direction or a vertical direction, i.e., in a longitudinal direction of a vehicle and to M position and B position arranged in parallel thereto. The shift lever 44 is longitudinally operable among R position, N position, and D position and between M position and B position and is operable between N position and M position in a transverse direction of the vehicle orthogonal to the longitudinal direction. In this embodiment, the parking button 50 is disposed as a separate switch in the proximity of the shift operating device 42 to set the shift range of the power transmission device 10 to the parking range (P range) for the parking lock.

When the parking button 50 is pressed, the shift range is set to the parking range (P range) as long as predetermined conditions are satisfied such as the vehicle being in the immobilized state with its foot brake kept pressed down for example. This parking range is a parking range interrupting the power transmission path within the power transmission device 10, i.e., putting the first motor M1 and the second motor M2 into their free-rotation states (free states) and executing the parking lock for mechanically stopping the rotation of the drive wheels 38 by the parking lock mechanism 74.

M position of the shift operating device 42 is an initial position (home position) of the shift lever 44, so that even though the shift operation is made to the shift position $P_{SH}$ (R, N, D, or B position) other than M position, the shift lever returns to M position by a mechanical system such as a spring the instant that the driver releases the shift lever 44, i.e., the instant that no external force is applied to the shift lever 44.

When the shift operating device 42 is shift-operated to one of shift positions $P_{SH}$, switching is made to a shift range corresponding to a shift position $P_{SH}$ after the shift operation. Describing the shift ranges, R range selected as a result of the shift operation of the shift lever 44 (shift operating device 42) to R position is a reverse driving range in which a driving force for backwardly moving the vehicle is transmitted to the drive wheels 38. A neutral range (N range) selected as a result of the shift operation of the shift lever 44 to N position is a neutral range for establishing a neutral state in which the power transmission path is interrupted within the power transmission device 10. D range selected by the shift operation of the shift lever 44 to D position is a forward driving range in which a driving force for forwardly moving the vehicle is transmitted to the drive wheels 38. If, when the shift range is in P range, the electronic control device 40 determines that a shift operation is made to a predetermined shift position $P_{SH}$ (specifically, R position, N position, or D position) for releasing a vehicle movement prevention (the parking lock), then it outputs a control signal for releasing the parking lock to the parking lock mechanism 74 so that the release of the parking lock is effected to allow switching to a shift range corresponding to a shift position $P_{SH}$ after the shift operation.

B range selected by the shift operation of the shift lever 44 to B position is a decelerated forward driving range (engine brake range) in which an engine braking effect is exerted in D range by e.g., causing the second motor M2 to generate a regenerative torque, to thereby decelerate the rotation of the drive wheels 38. Therefore, even though a shift operation of the shift lever 44 to B position is made when the current shift range is in a shift range other than D range, the electronic control device 40 disables the shift operation and, only when it is in D range, enables the shift operation to B position. That is, to give an example, even though the driver performs a shift operation to B position when in P range, the shift range still remains in P range.

In the shift operating device 42, the shift lever 44 returns to M position the instant that it is released, and hence the shift range being currently selected cannot be recognized by merely viewing the shift position $P_{SH}$ of the shift lever 44. For this reason, the shift range indicator (shift range display device) is disposed at a position easily viewable by the driver so that the shift range being currently selected is displayed on the shift range indicator including a case where it is P range.

The power transmission device 10 employs the so-called shift-by-wire, and the shift operating device 42 is two-dimensionally shift-operated in a first direction that is the longitudinal direction and in a second direction that is a transverse direction intersecting (intersecting at right angles in FIG. 4) with the first direction, so that in order to output the shift position $P_{SH}$ as detection signals from the position sensors to the electronic control device 40, the shift operating device 42 is provided with the shift sensor 46 as a first-direction detection means for detecting a shift operation in the first direction and with the select sensor 48 as a second-direction detection means for detecting a shift operation in the second direction. Both the shift sensor 46 and the select sensor 48 output a voltage as a detection signal in accordance with the shift position $P_{SH}$ to the electronic control device 40 so that the electronic control device 40 recognizes the shift position $P_{SH}$ based on the detection signal voltage. In other words, the first-direction detection means (shift sensor 46) and the second-direction detection means (select sensor 48) cooperatively make up a shift position detection means for detecting the shift position $P_{SH}$ of the shift operating device 42.

Figure 5:
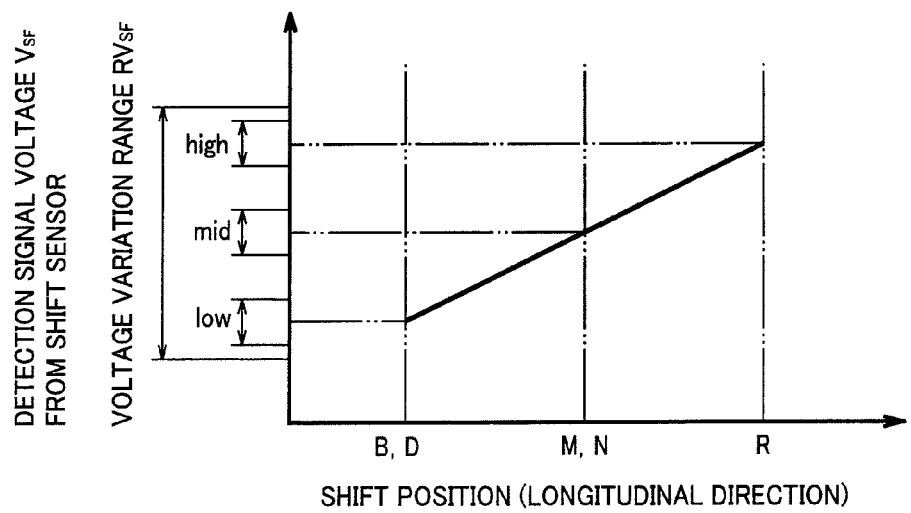
FIG. 5 is a diagram depicting a relationship between a longitudinal-direction shift position of the shift operating device of FIG. 4 and a detection signal voltage from a shift sensor included in the shift operating device.
Figures 6, 7:
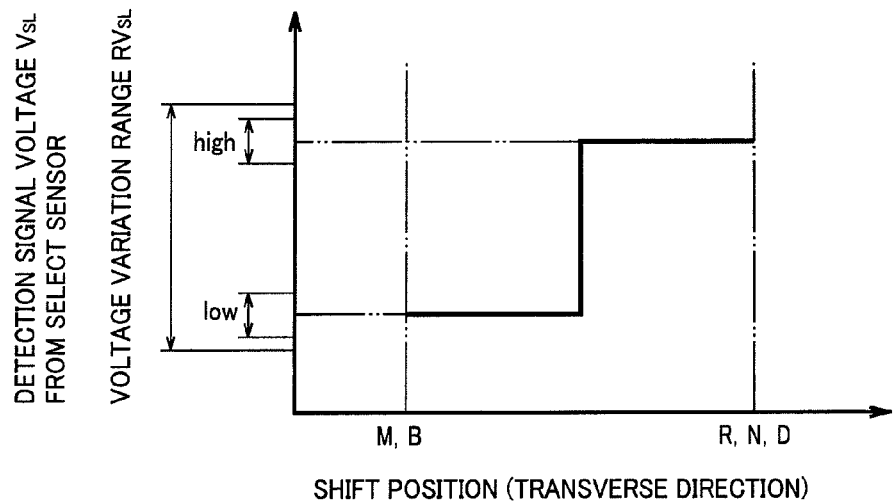
FIG. 6 is a diagram depicting a relationship between a transverse-direction shift position of the shift operating device of FIG. 4 and a detection signal voltage from a select sensor included in the shift operating device.
FIG. 7 is a diagram depicting a relationship of correspondence between combinations of detection signal voltages from the shift sensor and the select sensor and shift positions in the shift operating device of FIG. 4.

To give an example of recognition of the shift position $P_{SH}$, as depicted in FIG. 5, a detection signal voltage $V_{SF}$ from the shift sensor 46 results in a voltage falling within a low range when the shift position $P_{SH}$ in the longitudinal direction (first direction) is B or D position; results in a voltage falling within a mid range that is a higher voltage than that within the lower range when it is M or N position; and results in a voltage falling within a high range that is a higher voltage than that within the mid range when it is R position. As depicted in FIG. 6, a detection signal voltage $V_{SF}$ from the select sensor 48 results in a voltage falling within a low range when the shift position $P_{SH}$ in the transverse direction (second direction) is M or B position; and results in a voltage falling within a high range that is a higher voltage than that within the low range when it is R, N or D position. The electronic control device 40 detects the detection signal voltages $V_{SF}$ and $V_{SF}$ varying in this manner, to thereby recognize that the shift position $P_{SH}$ is N position when "$V_{SF}$=mid and $V_{SL}$=high"; that the shift position $P_{SH}$ is R position when $V_{SF}$=high and $V_{SL}$=high"; that the shift position $P_{SH}$ is D position when $V_{SF}$=low and $V_{SL}$=high", that the shift position $P_{SH}$ is M position when $V_{SF}$=mid and $V_{SL}$=low", and that the shift position $P_{SH}$ is B position when $V_{SF}$=low and $V_{SL}$=low".

The shift position $P_{SH}$ is recognized by the electronic control device 40 in this manner. For the purpose of preventing wrong operations, etc., however, a shift operation to the shift positions $P_{SH}$ does not bring about immediate switching to a shift range corresponding to the shift position $P_{SH}$ after the shift operation. Instead, a predetermined range settling time (shift operation settling time) is previously set for each of the shift positions $P_{SH}$ or for each of the shift ranges so that when the predetermined range settling time is reached by a stay time that is a time during which the shift lever 44 stays at a shift position $P_{SH}$ after a shift operation, the electronic control device 40 settles the shift operation to perform switching to a shift range corresponding to the shift position $P_{SH}$ after the shift operation. An example of switching from P range to N range will be given below. In a case where a shift operation is made from M position to N position when the shift range is P range, if the stay time of the shift lever 44 at N position reaches a neutral range settling time that is the predetermined range settling time for setting the shift operation to N position, the electronic control device 40 settles that the shift position $P_{SH}$ after the shift operation is N position, to switch the shift range from P range to N range. In this embodiment, for example, the predetermined range settling time for B position, R position, and D position is set to "100 ms" and the predetermined range settling time for N position is set to "500 ms". The predetermined range settling time (including the neutral range settling time) is used when the shift sensor 46 and the select sensor 48 are normal. When at least one of the sensors 46 and 48 is in fail, an on-fail range settling time time_f1 described later is used.

If the shift sensor 46 and the select sensor 48 are both normal, then switching to a shift range corresponding to the shift position $P_{SH}$ is made based on detection signals from the two position sensors 46 and 48 as described above. To this end, the electronic control device 40 requires an ability to determine whether the shift sensor 46 and the select sensor 48 are each normal or abnormal. Therefore, to detect an abnormality (failure, fail) attributable to e.g., a disconnection or a short circuit of the shift sensor 46 and the select sensor 48, voltage variation ranges $RV_{SF}$ and $RV_{SL}$ (see FIGS. 5 and 6) are experimentally set for the shift sensor 46 and the select sensor 48, respectively, the voltage variation ranges including within their respective ranges the detection signal voltages $V_{SF}$ and $V_{SF}$ appearing at all the shift positions $P_{SH}$. Then, if the detection signal voltages $V_{SF}$ and $V_{SF}$ fall outside the voltage variation ranges $RV_{SF}$ and $RV_{SL}$, respectively, the electronic control device 40 determines that the position sensors (shift sensor 46 and/or the select sensor 48) are abnormal.

Figure 8:
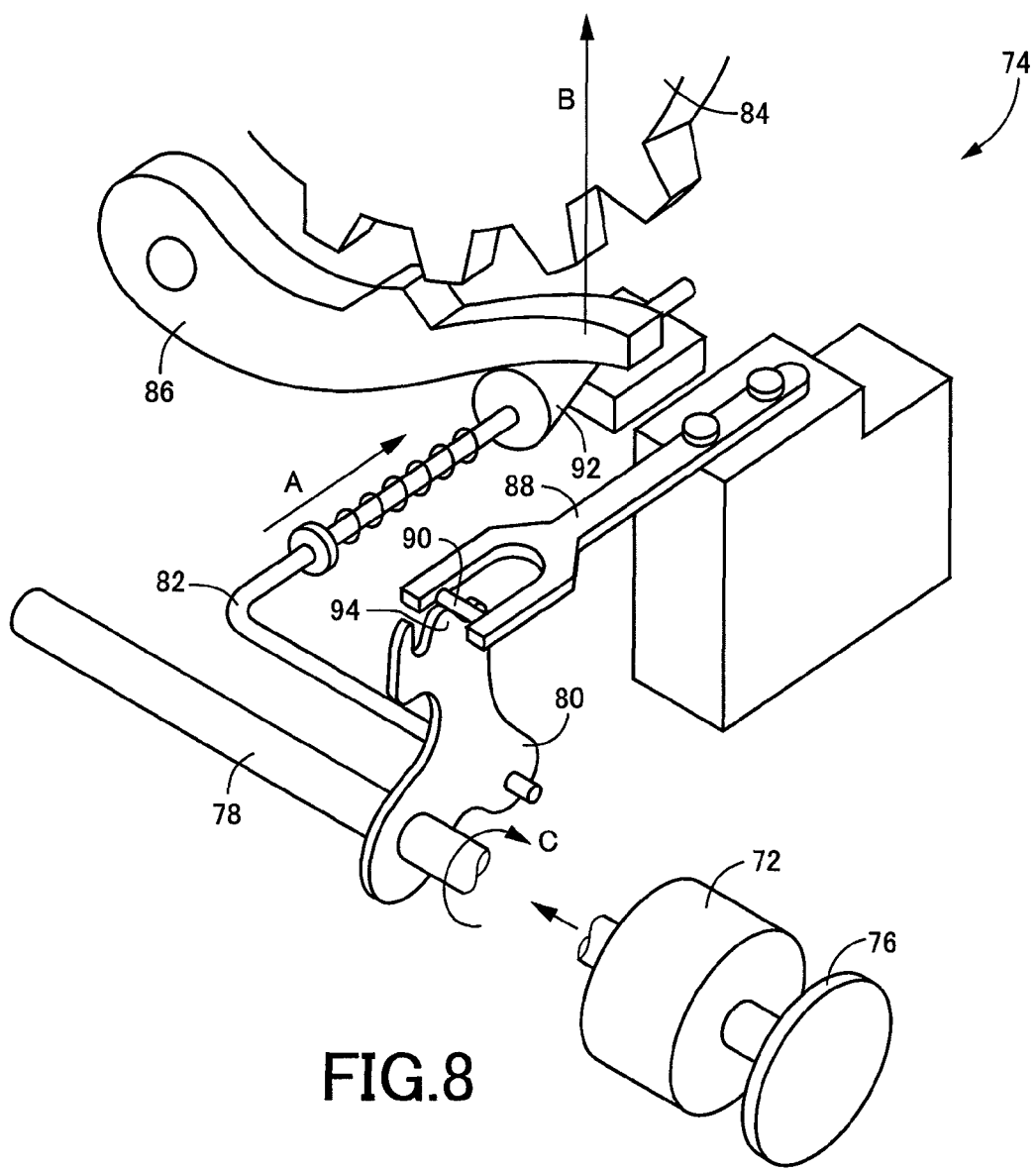
FIG. 8 is a diagram for explaining a configuration of a parking lock mechanism that mechanically stops the rotation of drive wheels and explaining e.g., a parking lock drive motor for driving the parking lock mechanism in the power transmission device for vehicle of FIG. 1.

FIG. 8 is a diagram for explaining a configuration of the parking lock mechanism 74 for mechanically stopping the rotation of the drive wheels 38 and explaining, e.g., a parking lock drive motor 72 for driving the parking lock mechanism 74.

The parking lock drive motor 72 is provided as a switched reluctance motor (SR motor) that drives the parking lock mechanism 74 by the shift-by-wire system in response to a command (control signal) from the electronic control device 40. An encoder 76 is a rotary encoder that outputs signals of A phase, B phase, and Z phase. The encoder 76 rotates integrally with the parking lock drive motor 72 and detects a status of rotation of the SR motor to feed the electronic control device 40 with a signal indicative of the status of rotation thereof, i.e., a pulse signal for acquiring a count value (encoder count) in accordance with the amount of movement (the amount of rotation) of the parking lock drive motor 72. The electronic control device 40 accepts the signal fed from the encoder 76 to grasp the status of rotation of the SR motor to thereby provide a power-supply control for driving the SR motor.

The parking lock mechanism 74 is an actuator that works to prevent the movement of a vehicle based on a control signal from the electronic control device 40. The parking lock mechanism 74 includes a shaft 78 that is rotationally driven by the parking lock drive motor 72; a detent plate 80 that rotates together with the rotation of the shaft 78; a rod 82 that acts following the rotation of the detent plate 80; a parking gear 84 that rotates in unison with the drive wheels 38; a parking lock pawl 86 for preventing (locking) the rotation of the parking gear 84; a detent spring 88 that limits the rotation of the detent plate 80 to fix the shift position; and a roller 90. Although no limitation is imposed on a site to dispose the parking gear 84 as long as its locking causes immediate locking of the drive wheels 38, the parking gear 84 of this embodiment is securely fixed to the transmitting member 18 on the first axis RC1 or securely fixed to the output shaft 22 on the second axis RC2.

The detent plate 80 is operatively coupled via the shaft 78 to a drive shaft of the parking lock drive motor 72 and, in cooperation with the rod 82, the detent spring 88, and the roller 90, functions as a parking lock positioning member that is driven by the parking lock drive motor 72 for switching a parking lock position corresponding to P range and a non parking lock position corresponding to the other shift ranges than P range. The function of a parking lock switching mechanism is implemented by the shaft 78, the detent plate 80, the rod 82, the detent spring 88, and the roller 90.

FIG. 8 depicts a state at the non parking lock position. In this state, the parking lock pawl 86 does not lock the parking gear 84, so that the rotation of the driving wheels 38 is not prevented by the parking lock mechanism 74. When, from this state, the shaft 78 is rotated by the parking lock drive motor 72 in a direction indicated by an arrow C of FIG. 8, the rod 82 is thrust via the detent plate 80 toward a direction indicated by an arrow A of FIG. 8, with the result that the parking lock pawl 86 is thrust up toward a direction indicated by an arrow B of FIG. 8 by the action of a tapered member 92 disposed on an end of the rod 82. The rotation of the detent plate 80 allows the roller 90 of the detent spring 88 lying at one of two depressions formed on a crest of the detent plate 80, i.e., lying at the non parking lock position to climb over a projection 94 to drop into the other depression, i.e., into the parking lock position. The roller 90 is disposed rotatably around its axis on the detent spring 88. When the detent plate 80 rotates until the roller 90 arrives at the parking lock position, the parking lock pawl 86 is thrust up to a position where it comes into engagement with the parking gear 84. This mechanically stops the rotation of the drive wheels 38 that rotate interlocking with the parking gear 84, allowing the shift range to be switched to P range.

Incidentally, if both of the shift sensor 46 and the select sensor 48 making up part of the shift-by-wire control system of the power transmission device 10 are normal, then the shift range is switched depending on the shift position $P_{SH}$ in accordance with the correspondence table of FIG. 7 as described above, whereas if one of the shift sensor 46 and the select sensor 48 becomes abnormal when the shift range is P range, then based on a detection signal from the normal position sensor 46 or 48 on the other there may occur switching from P range in order to release the parking lock by the driver's shift operation. The gist of the control function therefor will be described below.

Figure 9:
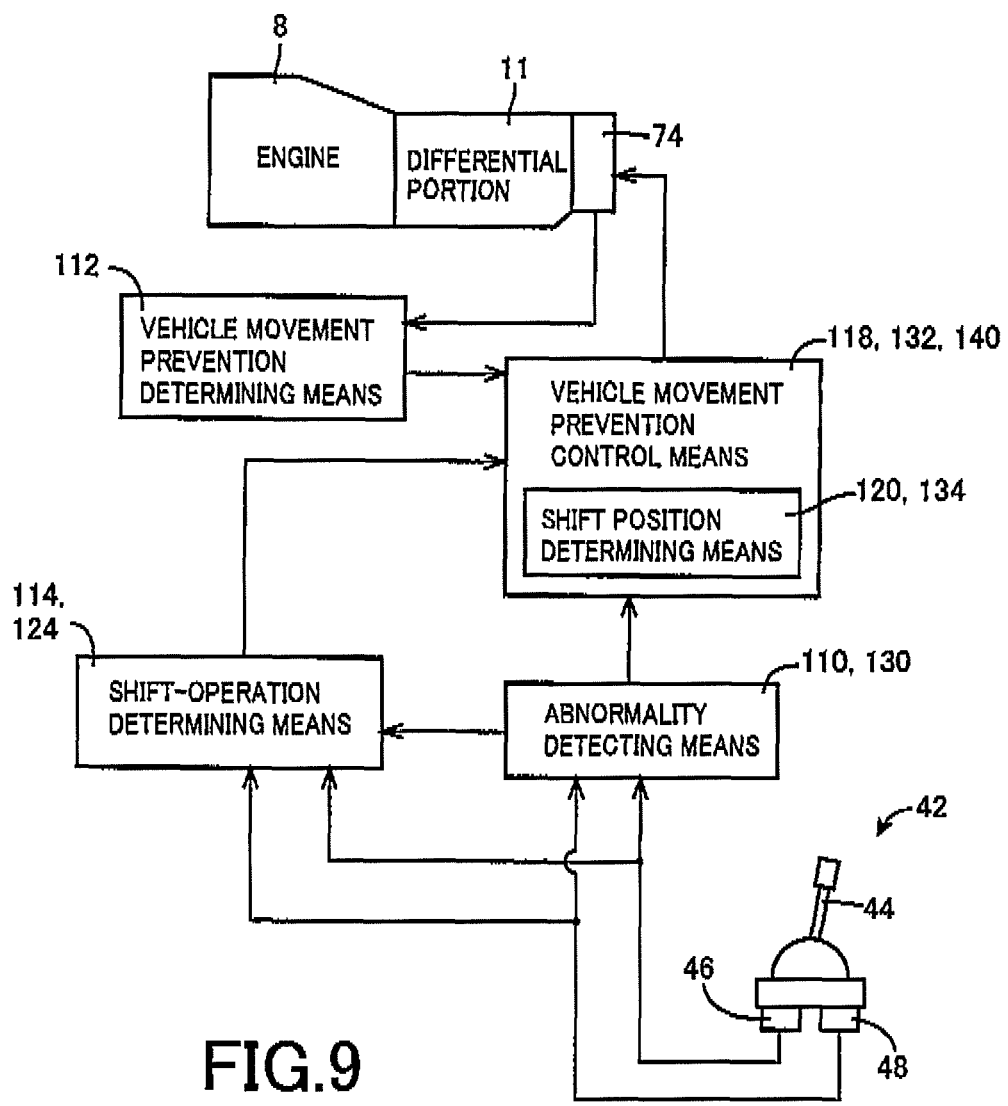
FIG. 9 is a function block diagram for explaining principal parts that implement control functions provided by the electronic control device of FIG. 3, which is common to a first embodiment through a fourth embodiment.

FIG. 9 is a function block diagram for explaining principal parts that implement control functions provided by the electronic control device 40. In FIG. 9, an abnormality detecting means 110 detects an abnormality in at least part of the shift position detection means. The abnormality in at least part of the shift position detection means refers to an abnormality occurring in either one of the shift sensor 46 (the first-direction detection means) and the select sensor 48 (the second-direction detection means). As regards a specific determination of whether the sensor is abnormal or not, the abnormality detecting means 110 determines for each of the shift sensor 46 (first-direction detection means) and the select sensor 48 (second-direction detection means) that it is abnormal if the detection signal voltages $V_{SF}$ and $V_{SF}$ from the sensors 46 and 48, respectively, fall outside their respective voltage variation ranges $RV_{SF}$ and $RV_{SL}$. That is, the abnormality detecting means 110 determines that the shift sensor 46 is abnormal if the detection signal voltage $V_{SF}$ from the shift sensor 46 falls outside the voltage variation range $RV_{SF}$, whereas in the reverse case, namely, if the detection signal voltage $V_{SF}$ falls within the voltage variation range $RV_{SF}$, then it determines that the shift sensor 46 is normal. In the same manner, the select sensor 48 is determined to be abnormal if the detection signal voltage $V_{SL}$ from the select sensor 48 falls outside the voltage variation range $RV_{SL}$, whereas in the reverse case, namely, if the detection signal voltage $V_{SL}$ falls within the voltage variation range $RV_{SL}$, then the select sensor 48 is determined to be normal. Furthermore, if both of the detection signal voltages $V_{SF}$ and $V_{SL}$ fall outside their respective voltage variation ranges $RV_{SF}$ and $RV_{SL}$, then the abnormality detecting means 110 determines that all of the shift position detection means is abnormal.

A vehicle movement prevention determining means 112 determines whether the vehicle movement is prevented or not by the parking lock mechanism 74, i.e., whether the parking lock is executed or not by the parking lock mechanism 74. For example, the vehicle movement prevention determining means 112 makes the determination by detecting whether the rotation position of the detent plate 80 of the parking lock mechanism 74 is at the parking lock position or not. When the shift range is P range, the vehicle movement prevention determining means 112 may determine that the vehicle movement is prevented by the parking lock mechanism 74.

A shift-operation determining means 114 determines whether the shift operating device 42 is shift-operated by the driver or not, based on a detection signal from at least one of the shift sensor 46 and the select sensor 48. Although there may be a case where the shift position $P_{SH}$ is substitutively recognized by a shift position determining means 120 which will be described later, the shift-operation determining means 114 does not make the determination based on the shift position $P_{SH}$ recognized by the shift position determining means 120, but it does make the determination based on the detection signal from the shift sensor 46 and/or the select sensor 48.

The shift-operation determining means 114 makes the determination also in a case where part of the shift position detection means is abnormal, i.e., where one of the shift sensor 46 and the select sensor 48 is abnormal. In that case, the determination is made based on a detection signal from one that is not abnormal (normal one) of the shift sensor 46 and the select sensor 48. In such a case where part of the shift position detection means is abnormal, for example, the shift-operation determining means 114 determines that the shift operating device 42 is shift-operated by the driver if the shift position $P_{SH}$ is varied from a pre-operation position or the last position $P_{LT}$ (position including M position) previously defined corresponding to each sensor abnormally to the other position after the abnormality detecting means 110 detects an abnormality in part (the shift sensor 46 or the select sensor 48) of the shift position detection means. In other words, if the shift position $P_{SH}$ is not the pre-operation position $P_{LT}$ (position including M position) when the abnormality detecting means 110 detects an abnormality in one of the shift sensor 46 and the select sensor 48, then the shift-operation determining means 114 does not determine that the shift operating device 42 is shift-operated by the driver until after the detection of the abnormality it is detected on the basis of a detection signal from the normal sensor 46 or 48 that the shift position $P_{SH}$ results in the pre-operation position $P_{LT}$. The reason to make such a determination is to prevent mis-recognition of the shift operation since the shift position $P_{SH}$ may not return to M position if baggage, etc., is hung on the shift lever 44 although the shift position $P_{SH}$ returns to M position when the shift lever 44 is released.

Specific description will be given of a case where one of the shift sensor 46 and the select sensor 48 is abnormal. For example, detection of an abnormality in the select sensor 48 allows the shift-operation determining means 114 to recognize only the shift position $P_{SH}$ (hereinafter, represented as "first-direction shift position $P1_{SH}$") in the first direction (see FIG. 4) since the shift position $P_{SH}$ (hereinafter, represented as "second-direction shift position $P2_{SH}$") in the second direction (see FIG. 4) becomes unknown. That is, as to the first-direction shift position $P1_{SH}$, the shift-operation determining means 114 is allowed to differentiate from one another a first-direction first position P1_1 indicative of R position, a first-direction second position P1_2 indicative of M position or N position, and a first-direction third position P1_3 indicative of B position or D position. In that case, the pre-operation position $P_{LT}$ is previously defined as a neutral position that is the first-direction second position P1_2 including M position (initial position), so that the shift-operation determining means 114 determines that the shift operating device 42 is shift-operated by the driver if, after the detection of an abnormality in the select sensor 48, the first-direction shift position $P1_{SH}$ is varied from the first-direction second position P1_2 (the pre-operation position $P_{LT}$) to the other position that is the first-direction first position P1_1 or the first-direction third position P1_3.

In a case where an abnormality is detected in the shift sensor 46, the shift-operation determining means 114 can recognize only the second-direction shift position $P2_{SH}$ since the first-direction shift position $P1_{SH}$ becomes unknown. That is, as to the second-direction shift position $P2_{SH}$, the shift-operation determining means 114 can differentiate from each other a second-direction first position P2_1 indicative of M position or B position and a second-direction second position P2_2 indicative of R position, N position, or D position. In that case, the pre-operation position $P_{LT}$ is previously defined as the second-direction first position P2_1 including M position (initial position), so that the shift-operation determining means 114 determines that the shift operating device 42 is shift-operated by the driver if, after the detection of an abnormality in the shift sensor 46, the second-direction shift position $P2_{SH}$ is varied from the second-direction first position P2_1 (the pre-operation position $P_{LT}$) to the other position that is the second-direction second position P2_2.

A vehicle movement prevention control means 118 permits the parking lock mechanism 74 that is the actuator to release the vehicle movement prevention, i.e., the parking lock if the shift-operation determining means 114 determines that the shift operating device 42 is shift-operated by the driver in cases where the vehicle movement prevention determining means 112 determines that the vehicle movement is prevented (parking-locked) by the parking lock mechanism 74 and where the abnormality detecting means 110 detects an abnormality in part of the shift position detection means.

Furthermore, the vehicle movement prevention control means 118 includes the shift position determining means 120. The shift position determining means 120 substitutes the shift position $P_{SH}$ as required for safer recognition in cases where the vehicle movement prevention determining means 112 determines that the vehicle movement is prevented (parking-locked) by the parking lock mechanism 74 and where the abnormality detecting means 110 detects an abnormality in part of the shift position detection means. Specifically, in the above cases, if the shift-operation determining means 114 determines that the shift operating device 42 is shift-operated by the driver, then the shift position determining means 120 substitutively recognizes the shift position $P_{SH}$ after the shift operation as N position irrespective of the actual shift position $P_{SH}$, whereas if it is not determined that the shift operating device 42 is shift-operated by the driver, then the shift position determining means 120 substitutively recognizes the shift position $P_{SH}$ as M position or B position. Therefore, if the shift position $P_{SH}$ after the shift operation is recognized as N position, then the shift range switches from P range to N range, so that the vehicle movement prevention control means 118 permits the parking lock mechanism 74 to release the parking lock as described above. That is, in the above case, the vehicle movement prevention control means 118 functions as a shift range switching means that switches the shift range from P range to N range in accordance with the shift position $P_{SH}$ recognized by the shift position determining means 120. On the other hand, the recognition of the shift position $P_{SH}$ as M position means no operation of the shift lever 44 and the recognition as B position disables the shift operation to B position when in P range, whereupon in either case, P range remains unvaried, not allowing the vehicle prevention control means 118 to release the parking lock.

Patterns of specific recognition of the shift position $P_{SH}$ by the shift position determining means 120 will be described referring to FIG. 10. FIG. 10 is a table for explaining shift positions $P_{SH}$ recognized by the electronic control device 40 when the shift range is P range. For reference, row [1] of FIG. 10 represents the recognized shift positions $P_{SH}$ when the shift sensor 46 and the select sensor 48 are normal, and in row [1], the actual shift positions $P_{SH}$ coincide with shift positions $P_{SH}$ recognized by the electronic control device 40.

As depicted in row [2] of FIG. 10, when the shift sensor 46 is abnormal (fails) and when the select sensor 48 is not normal, i.e., is normal, if the actual shift position $P_{SH}$ is M position or B position, then the shift position $P_{SH}$ is recognized as M position by the shift position determining means 120 since the M position and B position are included in the second-direction first position P2_1 (see FIG. 4) and since it is unknown whether the shift operation from the M position (initial position) is actually made or not. On the other hand, if the actual shift position $P_{SH}$ after the shift operation from the second-direction first position P2_1 (the pre-operation position $P_{LT}$) is N position, R position, or D position, then it is determined by the shift-operation determining means 114 that the shift operating device 42 is shift-operated by the driver, so that the shift position $P_{SH}$ is recognized as N position by the shift position determining means 120.

As depicted in row [5] of FIG. 10, when the shift sensor 46 is abnormal (fails) and when the select sensor 48 is abnormal (fails), the shift position $P_{SH}$ is recognized as M position irrespective of the actual shift position $P_{SH}$ by the shift position determining means 120 since it is unknown which position is the actual shift position $P_{SH}$ after the shift operation so that it is not determined that the shift operating device 42 is shift-operated by the driver. Therefore, when both the shift sensor 46 and the select sensor 48 are abnormal, if the current shift range is P range for example, P range remains continued irrespective of the actual shift position $P_{SH}$. Rows [3] and [4] of FIG. 10 will be described later in conjunction with description of a flowchart of FIG. 11.

Returning to FIG. 9, although the vehicle movement prevention control means 118 permits the parking lock mechanism 74 to release the vehicle movement prevention (parking lock) as long as predetermined conditions are satisfied as described above, the parking lock may be released immediately, if other conditions are satisfied, when the shift-operation determining means 114 determines that the shift operating device 42 is shift-operated by the driver. In this embodiment, however, the vehicle movement prevention control means 118 is employed when one of the shift sensor 46 and the select sensor 48 becomes abnormal and stores in advance a predetermined sensor on-fail range settling time time_f1 (predetermined time Time_f1) shorter than the neutral range settling time (e.g., 500 ms), whereby in case of releasing the parking lock when one of the two position sensors 46 and 48 is abnormal, it permits the parking lock mechanism 74 (actuator) to release the parking lock, i.e., the vehicle movement prevention when the predetermined sensor on-fail range settling time time_f1 (predetermined time_f1) has elapsed continuously from the time of the driver's shift operation of the shift operating device 42. The predetermined sensor on-fail range settling time time_f1 is a time for preventing wrong operations, etc., that is required to settle a shift range after a shift operation after the execution of the shift operation when one of the shift sensor 46 and the select sensor 48 becomes abnormal, and is preferably set to e.g., "100 ms" or to the shortest time among the range settling times upon the two sensors 46 and 48 being normal that are set for the shift positions $P_{SH}$ other than the pre-operation position $P_{LT}$.

Figure 11:
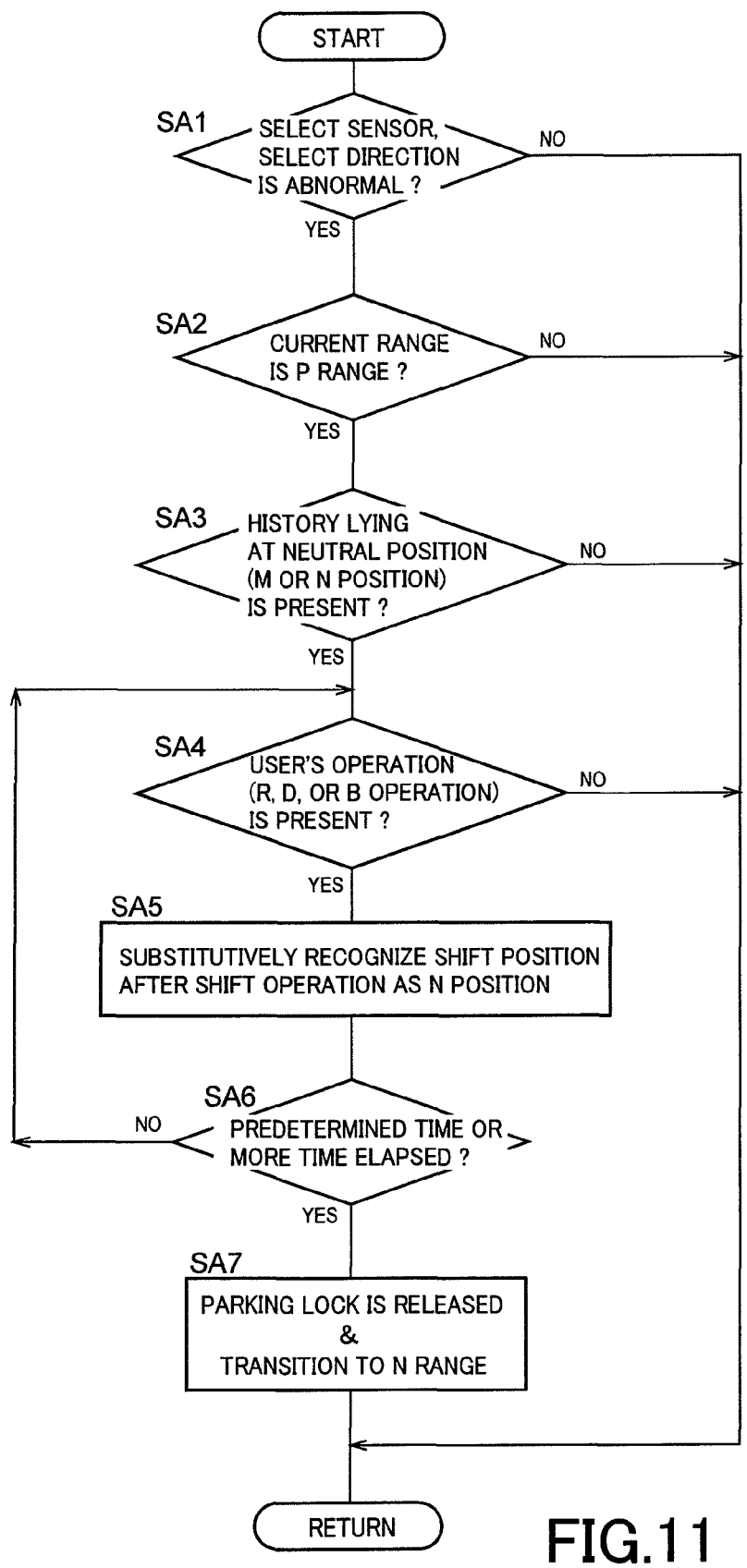
FIG. 11 is a flowchart of the first embodiment for explaining main control actions executed by the electronic control device of FIG. 3, i.e., control actions to release the parking lock when one of the two position sensors for detecting the shift position becomes abnormal, the flowchart explaining, by way of example, a case where the shift sensor of FIG. 4 is normal but the select sensor becomes abnormal.

FIG. 11 is a flowchart for explaining main control actions of the electronic control device 40, i.e., control actions to release the parking lock when one of the two position sensors for detecting the shift position $P_{SH}$ becomes abnormal, that are iteratively executed at a cycle time as extremely short as several msec to several tens of msec for example. Although the present invention is applicable to either case where the shift sensor 46 or the select sensor 48 becomes abnormal, the following description will be given of the flowchart (FIG. 11) of the case where the shift sensor 46 is normal but the select sensor 48 becomes abnormal for ease of understanding.

First, at step SA1 (hereinafter, the word "step" will be left out) corresponding to the abnormality detecting means 110, an abnormality, if any, is detected in the shift position detection means, that is, an abnormality, if any, is detected in each of the shift sensor 46 and the select sensor 48. It is thereby determined whether or not the shift sensor 46 is normal and the select sensor 48 is abnormal. If the determination at SA1 is affirmative, that is, if no abnormality is detected in the shift sensor 46 and an abnormality is detected in the select sensor 48, then the select direction, i.e., the second direction is regarded as abnormal with "shift sensor fail flag xfsft=OFF and select sensor fail flag xfslct=ON", allowing the procedure to proceed to SA2. On the contrary, if the determination at SA1 is negative, then the flowchart of FIG. 11 comes to an end. The shift sensor fail flag xfsft and the select sensor fail flag xfslct indicative respectively of whether the shift sensor 46 and the select sensor 48 are respectively abnormal are set to "ON" when the sensor is abnormal and to "OFF" when the sensor is normal.

At SA2 corresponding to the vehicle movement prevention determining means 112, it is determined whether the parking lock is executed or not by the parking lock mechanism 74, that is, whether the current shift range is P range or not. If the determination at SA2 is affirmative, i.e., if the current shift range is P range, then the procedure proceeds to SA3. On the contrary, if the determination at SA2 is negative, then the flowchart of FIG. 11 comes to an end.

At SA3 corresponding to the shift-operation determining means 114, it is determined based on a detection signal from the shift sensor 46 whether or not there exists a history of the shift lever 44 lying at the neutral position that is the pre-operation position $P_{LT}$, specifically, lying at the first-direction second position P1_2 indicative of M position or N position when or after no abnormality is detected in the shift sensor 46 and an abnormality is detected in the select sensor 48 at SA1. The reason is that if there is no history of lying at the first-direction second position P1_2, then a first-direction shift position $P1_{SH}$ can not change from the first-direction second position P1_2 (the pre-operation position $P_{LT}$) to the other position that is the first-direction first position P1_1 or the first-direction third position P1_3. If the determination at SA3 is affirmative, that is, if there is a history lying at the first-direction second position P1_2, then "select sensor fail-safe enabling flag xslctflsfen=ON" is set, allowing the procedure to proceed to SA4. On the contrary, if the determination at SA3 is negative, then "select sensor fail-safe enabling flag xslctflsfen=OFF" is set, bringing the flowchart of FIG. 11 to an end.

At SA4 corresponding to the shift-operation determining means 114, it is determined based on a detection signal from the shift sensor 46 whether the shift operating device 42 is shift-operated by the driver or not (user). Specifically, since at SA3, the determination is already made of the presence of the history lying at the first-direction second position P1_2, it is determined whether the current first-direction shift position $P1_{SH}$ is the first-direction first position P1_1 (R position) or the first-direction third position P1_3 (B position or D position). If as a result the current first-direction shift position P1$_{SH}$ is the first-direction first position P1_1 or the first-direction third position P1_3, then it is determined that the shift operating device 42 is shift-operated by the driver. If the determination at SA4 is affirmative, i.e., when the current first-direction shift position P1$_{SH}$ is the first-direction first position P1_1 or the first-direction third position P1_3, then the procedure proceeds to SA5. On the contrary, if the determination at SA4 is negative, then the flowchart of FIG. 11 comes to an end.

Executing SA5 corresponding to the shift position determining means 120 is that as a result of the shift operation, the first-direction shift position P1$_{SH}$ based on a detection signal from the shift sensor 46 changes from the first-direction second position P1_2 to the first-direction first position P1_1 or the first-direction third position P1_3. At SA5, the shift position P$_{SH}$ after the shift operation is substitutively recognized as N position irrespective of its actual position.

Patterns of recognition of the shift position P$_{SH}$ differing in accordance with the determination at SA3 will now be described referring to FIG. 10. Descriptions in rows [3] and [4] of FIG. 10 are both based on that the shift sensor 46 is normal. As depicted in row [3] of FIG. 10, when the select sensor 48 is abnormal (fails) and when negative determination is made at SA3, i.e., when the select sensor fail-safe is disabled with "select sensor fail-safe enabling flag xslctflsfen=OFF", the electronic control device 40 recognizes the shift position P$_{SH}$ as M position if the actual shift position P$_{SH}$ is N position, R position, or M position, while the electronic control device 40 recognizes the shift position P$_{SH}$ as B position if the actual shift position P$_{SH}$ is D position or B position. Even though the shift position P$_{SH}$ recognized in P range changes to either B position or M position, P range remains unvaried.

On the other hand, as depicted in row [4] of FIG. 10, when the select sensor 48 is abnormal (fails) and when affirmative determination is made at SA3, i.e., when the select sensor fail-safe is enabled with "select sensor fail-safe enabling flag xslctflsfen=ON", the electronic control device 40 recognizes the shift position P$_{SH}$ as M position if the actual shift position P$_{SH}$ is N position or M position, while if the actual shift position P$_{SH}$ is R position, D position or B position, then the electronic control device 40 substitutively recognizes the shift position P$_{SH}$ as N position through the execution of SA5.

Referring back to FIG. 11, it is determined at SA6 corresponding to the vehicle movement prevention control means 118 whether or not the predetermined sensor on-fail range settling time time_f1 (predetermined time_f1) or more has elapsed continuously from the time of the driver's shift operation of the shift operating device 42 (from the time of the affirmative determination at SA4), specifically, whether or not the predetermined sensor on-fail range settling time time_f1 or more has elapsed continuously from the time when the first-direction shift position P1$_{SH}$ changes from the first-direction second position P1_2 (M position or N position) to the first-direction first position P1_1 (R position) or the first-direction third position P1_3 (B position or D position). If the determination at SA6 is affirmative, i.e., if the predetermined sensor on-fail range settling time time_f1 or more has elapsed continuously from the time when the first-direction shift position P1$_{SH}$ changes from the first-direction second position P1_2 to the first-direction first position P1_1 or the first-direction third position P1_3, then the procedure proceeds to SA7. On the contrary, if the determination at SA6 is negative, then the procedure proceeds to SA4.

At SA7 corresponding to the vehicle movement prevention control means 118, the parking lock mechanism 74 is fed with an NP output (parking lock release command) that is a control signal for releasing the parking lock, so that the parking lock mechanism 74 release the parking lock, allowing the shift range to transition from P range to N range. Furthermore, at SA7, after output of the NP output (parking lock release command) to the parking lock mechanism 7, the history is erased of lying at the first-direction second position P1_2 that is affirmed at SA3, switching to "select sensor fail-safe enabling flag xslctflsfen=OFF".

Figure 12:
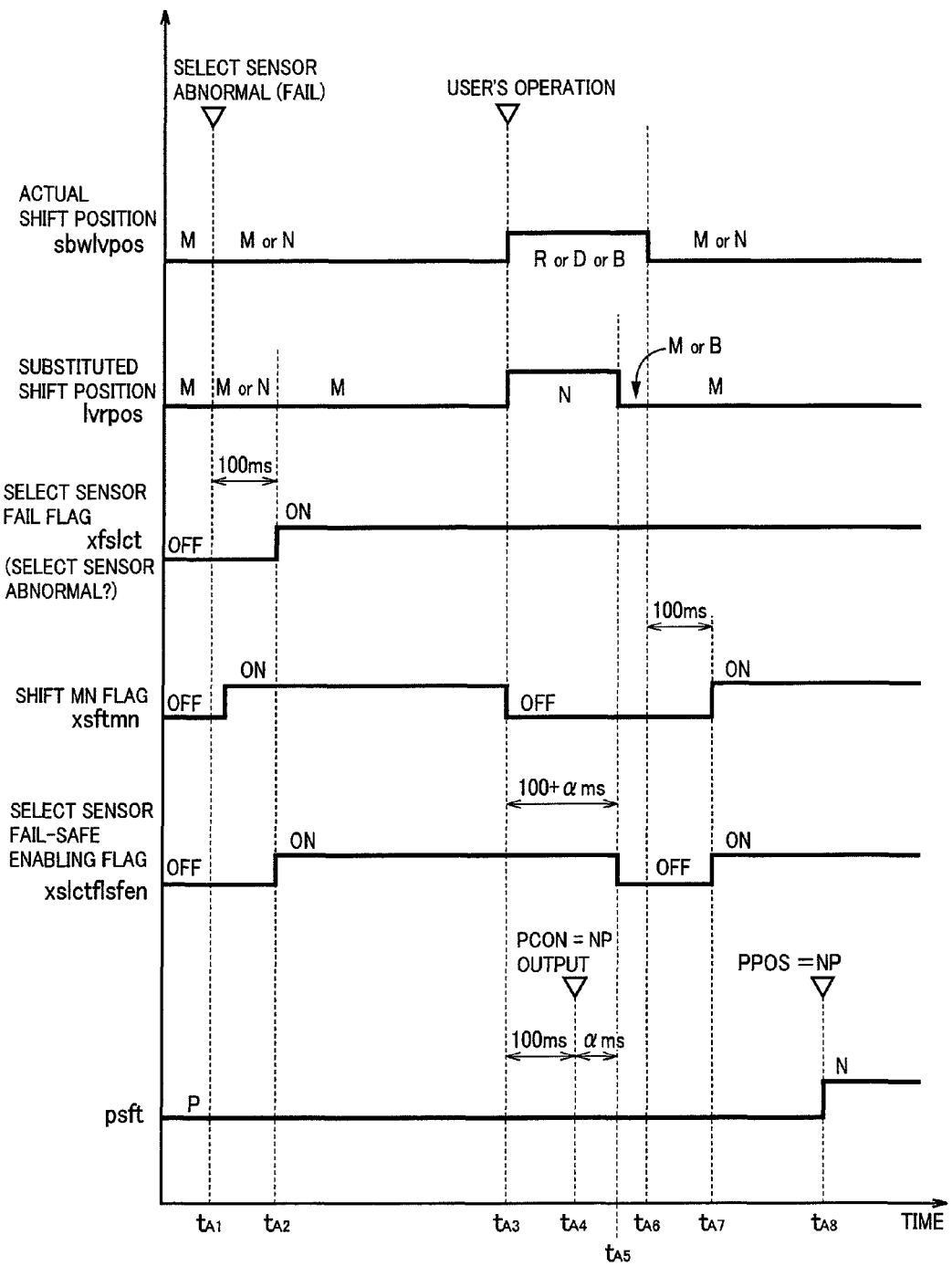
FIG. 12 is a timing chart for explaining control actions depicted in the flowchart of FIG. 11, specifically, depicting an exemplary case where, when the shift sensor of FIG. 4 remains normal but the select sensor becomes abnormal with the actual shift position at M position, the actual shift position is thereafter shift-operated from M position to R position, D position, or B position.

FIG. 12 is a timing chart for explaining control actions depicted in the flowchart of FIG. 11, specifically, depicting an exemplary case where, when the shift sensor 46 remains normal but the select sensor 48 becomes abnormal with the actual shift position P$_{SH}$ at M position, the actual shift position P$_{SH}$ is thereafter shift-operated from M position to R position, D position, or B position. The timing chart of FIG. 12 depicts, in the order from above, (i) actual shift position (hereinafter, represented as "real shift position sbwlvpos" in the descriptions of FIGS. 12 and 13"); (ii) shift position that is substitutively recognized by the shift position determining means 120 (hereinafter, represented as "substituted shift position lvrpos" in the descriptions of FIGS. 12 and 13); (iii) select sensor fail flag xfslct; (iv) shift MN flag xsftmn that turns to ON if the shift lever 44 lies at M position or N position based on a detection signal from the shift sensor 46, for determining whether or not there exists a history of the shift lever 44 lying at the first-direction second position P1_2 at SA3 of FIG. 11; (v) select sensor fail-safe enabling flag xslctflsfen that turns to ON if enabling a parking lock release command (NP output) when the select sensor 48 is abnormal; and (vi) parameter psft indicative of a shift range (represented as "psft=P" when in P range and as "psft=N" when in N range).

Time t$_{41}$ of FIG. 12 represents a point of time at which the select sensor 48 becomes abnormal, i.e., a point of time at which the detection signal voltage V$_{SL}$ from the select sensor 48 falls outside the voltage variation range RV$_{SL}$. Then, at time t$_{42}$ after the elapse of a sensor abnormality settling time that is previously set to about 100 ms for example from the time t$_{41}$, the abnormality of the select sensor 48 is settled and the determination at SA1 of FIG. 11 is affirmed so that the select sensor fail flag xfslct switches from OFF to ON. Time t$_{42}$ at which the select sensor fail flag xfslct switches from OFF to ON is a time when the abnormality of the select sensor 48 is detected by the abnormality detecting means 110. Furthermore, since at time t$_{42}$, parking lock is already made, i.e., "psft=P (see FIG. 12), the determination at SA2 of FIG. 11 is affirmed at time t$_{42}$ of FIG. 12, allowing the step of FIG. 11 to proceed to SA3. Then, since "shift MN flag xsftmn=ON" at time t$_{42}$, the determination at SA3 of FIG. 11 is affirmed. To describe this focusing on the flags, since "select sensor fail flag xfslct=ON" and "shift MN flag xsftmn=ON" at time t$_{42}$ of "psft=P", the determination at SA3 is affirmed so that the select sensor fail-safe enabling flag xsslctflsfen switches from OFF to ON.

Time t$_{43}$ of FIG. 12 represents a point of time at which the shift lever 44 is actually shift-operated from M position or N position to R position, D position, or B position by the driver (user), that is, a point of time at which switching is made from "real shift position sbwlvpos=M or N" to "real shift position sbwlvpos=R, D, or B". As a result, the shift MN flag switches from ON to OFF at time t$_{43}$. Furthermore, at time t$_{43}$, the shift position P$_{SH}$ is substitutively recognized as N position through the execution of SA5 of FIG. 11, so that the substituted shift position lvrpos of FIG. 12 switches M position to N position. Then, at time $t_{A4}$ after the elapse of the sensor on-fail range settling time time_f1 that is previously set to about 100 ms for example from the time $t_{A3}$, the determination at SA6 of FIG. 11 is affirmed so that the parking lock release command (NP output) is issued through the execution of SA7, i.e., so that "parking lock release command PCON=NP output" results. At that time, the parking lock release command (NP output) is issued under the condition of "select sensor fail-safe enabling flag xslctflsfen=ON".

At time $t_{A5}$ after the elapse of a predetermined delay time a from the time $t_{A4}$, the select sensor fail-safe enabling flag xslctflsfen is switched from ON to OFF at SA7 of FIG. 11. In accompaniment therewith, the substituted shift position lvrpos of FIG. 12 switches from M position to B position (see [3] of FIG. 10). Since "select sensor fail-safe enabling flag xslctflsfen=ON" is required at the point of time (time $t_{A4}$) when the parking lock release command (NP output) is issued, the delay time α from time $t_{A4}$ up to time $t_{A5}$ is set to a time as short as possible but sufficient not to impede the parking lock release command, e.g., of the order of "α=16 ms".

Time $T_{A6}$ represents a point of time at which the real shift position sbwlvpos switches from M position to N position, and at time $T_{A7}$ after the elapse of a preset determination time of the order of 100 ms for example from the time $t_{A6}$, the shift MN flag xsftmn turns from OFF to ON, and therefore, the condition to turn the select sensor fail-safe enabling flag xslctflsfen to ON is satisfied so that the select sensor fail-safe enabling flag xslctflsfen switches from OFF to ON.

At time $t_{A8}$, since the parking lock release command (NP output) is issued at the time $t_{A4}$, the parking lock switches to a released state NP so that the parameter indicative of the state of the parking lock results in "PPOS=NP", i.e., so that the parameter psft indicative of the shift range switches from "P" (P range) to "N" (N range).

Figure 13:
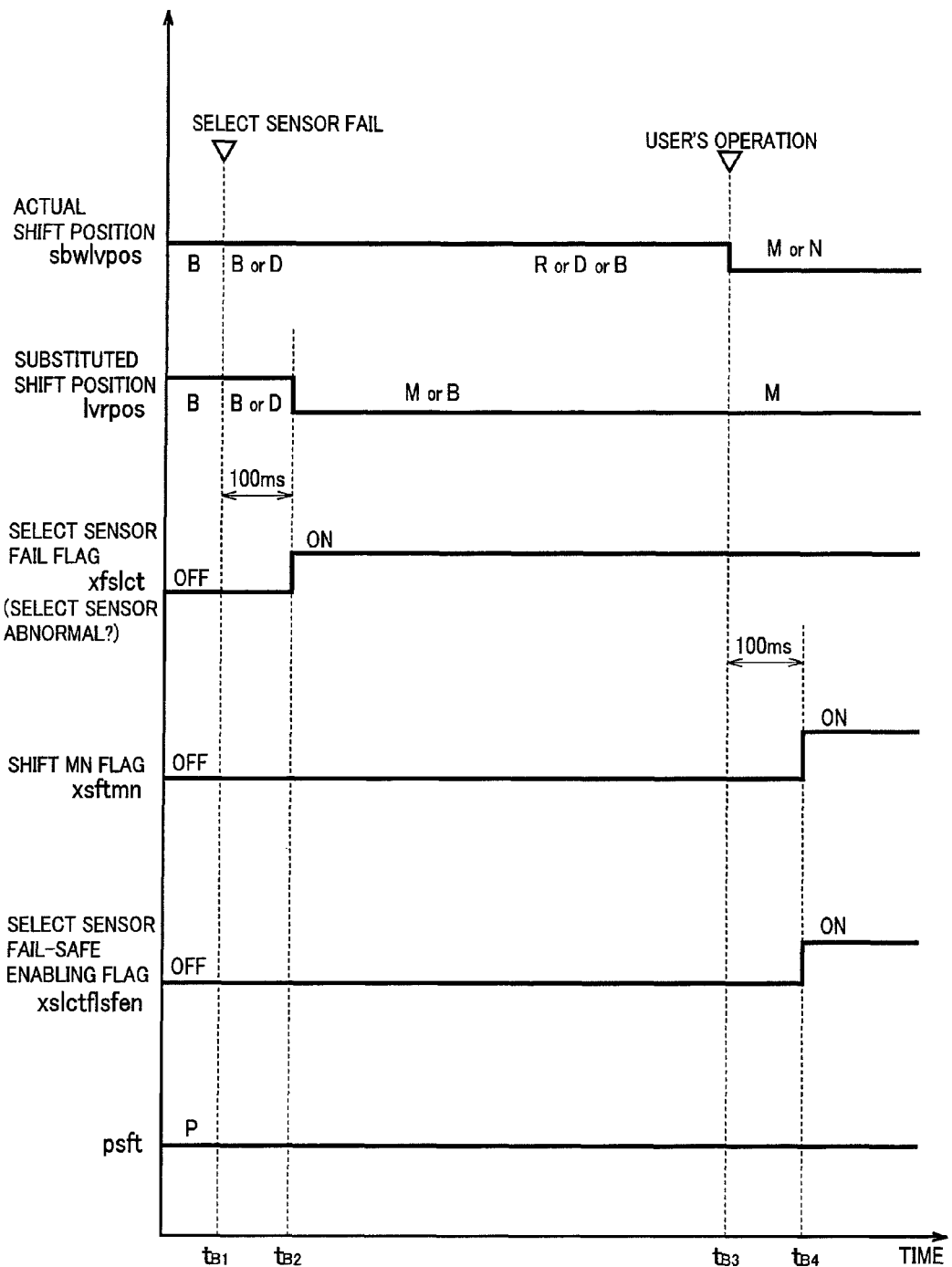
FIG. 13 is a timing chart under the conditions different from those of FIG. 12, for explaining control actions depicted in the flowchart of FIG. 11, specifically, depicting an exemplary case where the shift sensor remains normal but the select sensor becomes abnormal when the actual shift position remains fixed at B position due to baggage, etc., hung on the shift lever of FIG. 4.
Figure 14:
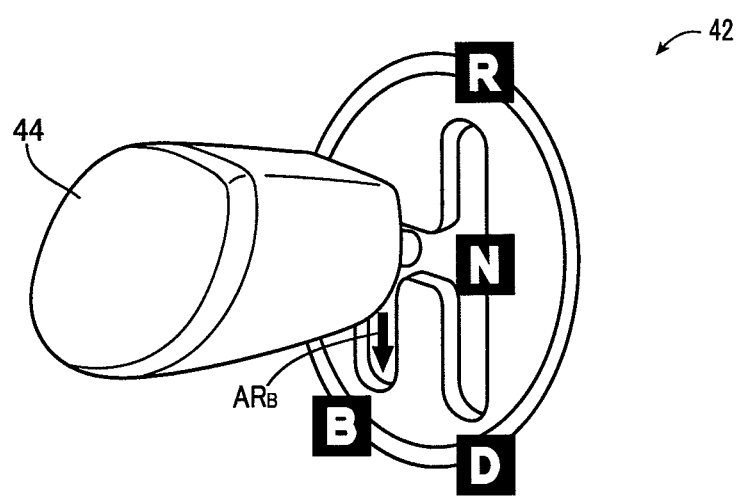
FIG. 14 is a diagram exemplifying an external view of the shift operating device of FIG. 4.

FIG. 13 is a timing chart under the conditions different from those of FIG. 12, for explaining control actions depicted in the flowchart of FIG. 11, specifically, depicting an exemplary case where the shift sensor 46 remains normal but the select sensor 48 becomes abnormal when the actual shift position $P_{SH}$ remains fixed at B position due to baggage, etc., hung on the shift lever 44. The timing chart of the same type as in FIG. 12 is depicted in FIG. 13. Specifically assuming a situation where the actual shift position $P_{SH}$ remains fixed at B position, in a vehicle having the shift operating device 42 provided with the shift lever 44 protruding from an instrument panel toward the driver as in FIG. 14 for example, the shift lever 44 may possibly be displaced toward a direction indicated by an arrow $AR_B$ of FIG. 14 as a result of baggage, etc., being hung on the shift lever 44.

Similar to time $t_{A1}$ and time $t_{A2}$ of FIG. 12, time $t_{B1}$ and time $t_{B2}$ represent respectively a point of time when the select sensor 48 becomes abnormal and a point of time when the select sensor fail flag xfslct switches from OFF to ON. At time $t_{B2}$, the real shift position sbwlvpos is B position and hence "shift MN flag xsftmn=OFF" results different from time $t_{A2}$ of FIG. 12. Accordingly, the determination at SA3 of FIG. 11 is negated so that "select sensor fail-safe enabling flag xslctflsfen=OFF" still remains.

Time $t_{B3}$ of FIG. 13 represents a point of time when the shift lever 44 is actually shift-operated from B position to M position or N position by the driver (user). At time $t_{B4}$ subsequent thereto, the shift MN flag xsftmn turns from OFF to ON similarly to time $t_{A7}$ of FIG. 12 so that the condition to turn the select sensor fail-safe enabling flag xslctflsfen to ON is satisfied, allowing the select sensor fail-safe enabling flag xslctflsfen to switch from OFF to ON. Then, in FIG. 13, "psft=P" remains unvaried throughout and the shift range stays at P range, not allowing the parking lock to be released.

To compare FIG. 12 and FIG. 13 in this manner, as depicted in FIG. 12, when the driver intentionally performs a shift-operation to R position, D position, or B position, transition is made from P range to N range to release the parking lock. On the other hand, as depicted in FIG. 13, even though the real shift position sbwlvpos is R position, D position, or B position (lies at B position in FIG. 13) without the driver's intention when the select sensor 48 becomes abnormal, the parking lock is not released.

The electronic control device 40 of this embodiment has the following effects (A1) to (A7).

(A1) According to this embodiment, the abnormality detecting means 110 detects an abnormality in at least part of the shift position detection means, and the shift-operation determining means 114 determines whether the shift operating device 42 is shift-operated by the driver or not, based on a detection signal from at least one of the shift sensor 46 and the select sensor 48. Then, the vehicle movement prevention control means 118 permits the parking lock mechanism 74 to release the vehicle movement prevention, i.e., to release the parking lock if it is determined by the shift-operation determining means 114 that the shift operating device 42 is shift-operated by the driver in cases where the vehicle movement prevention determining means 112 determines that the vehicle movement is prevented (parking-locked) by the parking lock mechanism 74 and where the abnormality detecting means 110 detects an abnormality in part of the shift position detection means. It is thus possible for the driver to release the vehicle movement prevention effected by the parking lock mechanism 74 even when one of the shift sensor 46 and the select sensor 48 becomes abnormal that are included in the shift-by-wire control system making up the intervention between the shift operating device 42 and the parking lock mechanism 74. Furthermore, the vehicle movement prevention (parking lock) is not released until the shift-operation determining means 114 determines that the shift operating device 42 is shift-operated by the driver even though the shift operating device 42 is shift-operated to the predetermined shift position $P_{SH}$ (specifically, R position, N position, or D position) at which the vehicle movement prevention is released when the shift sensor 46 and/or the select sensor 48 are/is abnormal, thereby obviating a release of the vehicle movement prevention against the driver's intention.

(A2) According to this embodiment, the parking lock mechanism 74 for mechanically stopping the rotation of the drive wheels 38 includes the parking lock drive motor 72. The parking lock drive motor 72 is provided as the switched reluctance motor (SR motor) and receives a command (control signal) from the electronic control device 40 to drive the parking lock mechanism 74 by the shift-by-wire system, whereby even when the shift sensor 46 or the select sensor 48 becomes abnormal with the parking lock being in action, the parking lock is released by the NP output to enable the vehicle movement as long as, based on a detection signal from the normal one of the sensors 46 and 48, the shift-operation determining means 114 determines that the shift operating device 42 is shift-operated by the driver.

(A3) According to this embodiment, the shift-operation determining means 114 determines that the shift operating device 42 is shift-operated by the driver if the shift position $P_{SH}$ changes from the pre-operation position $P_{LT}$ to the other position after detection by the abnormality detecting means 110 of an abnormality in part (the shift sensor 46 or the select sensor 48) of the shift position detection means, whereby it can easily be determined whether the shift operating device 42 is shift-operated by the driver or not. If the shift position $P_{SH}$ already lies at a position other than the pre-operation position $P_{LT}$ before detection of an abnormality in the shift sensor 46 or the select sensor 48, then the vehicle movement prevention is not released, so that when it is unknown whether the presence of the shift position $P_{SH}$ at the position other than the pre-operation position $P_{LT}$ is due to the driver's intention or not, the vehicle movement prevention is not released, thereby obviating a release of the vehicle movement prevention against the driver's intention.

(A4) According to this embodiment, the vehicle movement prevention control means 118 is employed when one of the shift sensor 46 and the select sensor 48 becomes abnormal and stores in advance a predetermined sensor on-fail range settling time time_f1 shorter than the neutral range settling time, whereby in case of releasing the parking lock when one of the two position sensors 46 and 48 is abnormal, the parking lock is released when the predetermined sensor on-fail range settling time time_f1 has elapsed continuously from the time of the driver's shift operation of the shift operating device 42. Thus, the vehicle movement prevention (parking lock) is released also when the shift operation is performed by the driver without driver's intention to place the shift range in the neutral range but with driver's intention to place it in the other shift range (R or D range) allowing the release of the parking lock than the neutral range.

(A5) According to this embodiment, the shift-operation determining means 114 determines whether the shift operating device 42 is shift-operated by the driver or not in a case where part of the shift position detection means is abnormal, i.e., where one of the shift sensor 46 and the select sensor 48 is abnormal. In such a case, the determination is made based on a detection signal from normal one of the shift sensor 46 and the select sensor 48. Thus, even when one of the shift sensor 46 and the select sensor 48 becomes abnormal, there is a case where determination of the driver's shift operation can be made from a change in the shift position $P_{SH}$ detected by the other that is normal, and in such a case, the vehicle movement prevention (parking lock) can be released based on the driver's shift operation.

(A6) According to this embodiment, if the detection signal voltages $V_{SF}$ and $V_{SF}$ fall outside the voltage variation range $RV_{SF}$ an $RV_{SF}$, respectively, then the electronic control device 40 determines that the position sensor (the shift sensor 46 and/or the select sensor 48) is abnormal, as a result of which it can objectively and simply be determined whether the shift sensor 46 and the select sensor 48 are respectively abnormal or not.

(A7) In cases where the vehicle movement prevention determining means 112 determines that the vehicle movement is prevented (parking locked) by the parking lock mechanism 74 and where an abnormality is detected in part of the shift position detection means by the abnormality detecting means 110, the shift position determining means 120 recognizes, if it is determined by the shift-operation determining means 114 that the shift operating device 42 is shift-operated by the driver, the shift position $P_{SH}$ after the shift operation as N position irrespective of the actual shift position $P_{SH}$, and the vehicle movement prevention control means 118 switches the shift range from P range to N range in accordance with the shift position $P_{SH}$ recognized by the shift position determining means 120. Therefore, since the shift range after the switching is N range, the drive wheels 38 cannot be driven even though the vehicle movement prevention control means 118 permits the parking lock mechanism 74 to release the parking lock, thereby achieving an improvement in safety of the shift operation.

Another embodiment of the present invention will then be described. In the following description, portions common to the embodiments are designated by the same reference numerals and will not again be described.

Second Embodiment

A function block diagram of a second embodiment is similar to the function block diagram of FIG. 9 of the first embodiment. In the second embodiment, the shift-operation determining means 114 is replaced by a shift-operation determining means 124, with the other means being common to the two embodiments. Differences therebetween will chiefly be described hereinbelow.

Referring again to FIG. 9, similar to the shift-operation determining means 114, the shift-operation determining means 124 determines based on a detection signal from at least one of the shift sensor 46 and the select sensor 48 whether the shift operating device 42 is shift-operated by the driver or not. The shift-operation determining means 124 is similar to the shift-operation determining means 114 of the first embodiment in that it makes the determination also when one of the shift sensor 46 and the select sensor 48 is abnormal and that, in such a case, the determination is made based on a detection signal from normal one of the shift sensor 46 and the select sensor 48. However, in a case where one of the shift sensor 46 and the select sensor 48 has an abnormality, the shift-operation determining means 114 of the first embodiment determines that the shift operating device 42 is shift-operated by the driver if the shift position $P_{SH}$ changes from the predefined pre-operation position $P_{LT}$ to the other position after the detection of the abnormality by the abnormality detecting means 110, whereas the shift-operation determining means 124 of this embodiment differs therefrom in that it determines whether the shift operating device 42 is shift-operated by the driver or not without defining the pre-operation position $P_{LT}$ in advance. Specifically, the shift-operation determining means 124 stores in advance one or more intentional operation patterns that are patterns of change in the shift position $P_{SH}$ that is regarded as the driver's shift operation and determines that the shift operating device 42 is shift-operated by the driver if there occurs a change in the shift position $P_{SH}$ that coincides with the intentional operation pattern after the abnormality detecting means 110 detects an abnormality in one of the shift sensor 46 and the select sensor 48. For example, the shift-operation determining means 124 stores a change in the first-direction shift position $P1_{SH}$ from the first-direction third position P1_3 (B position or D position) to the first-direction first position P1_1 (R position) as one pattern of the intentional operation patterns when the shift sensor 46 is normal but the select sensor 48 has an abnormality. In such a case, if the first-direction shift position $P1_{SH}$ changes from the first-direction third position P1_3 to the first-direction first position P1_1 after the detection of the abnormality by the abnormality detecting means 110, then the shift-operation determining means 124 determines that the shift operating device 42 is shift-operated by the driver since the change coincides with the intentional operation patterns stored.

Figure 15:
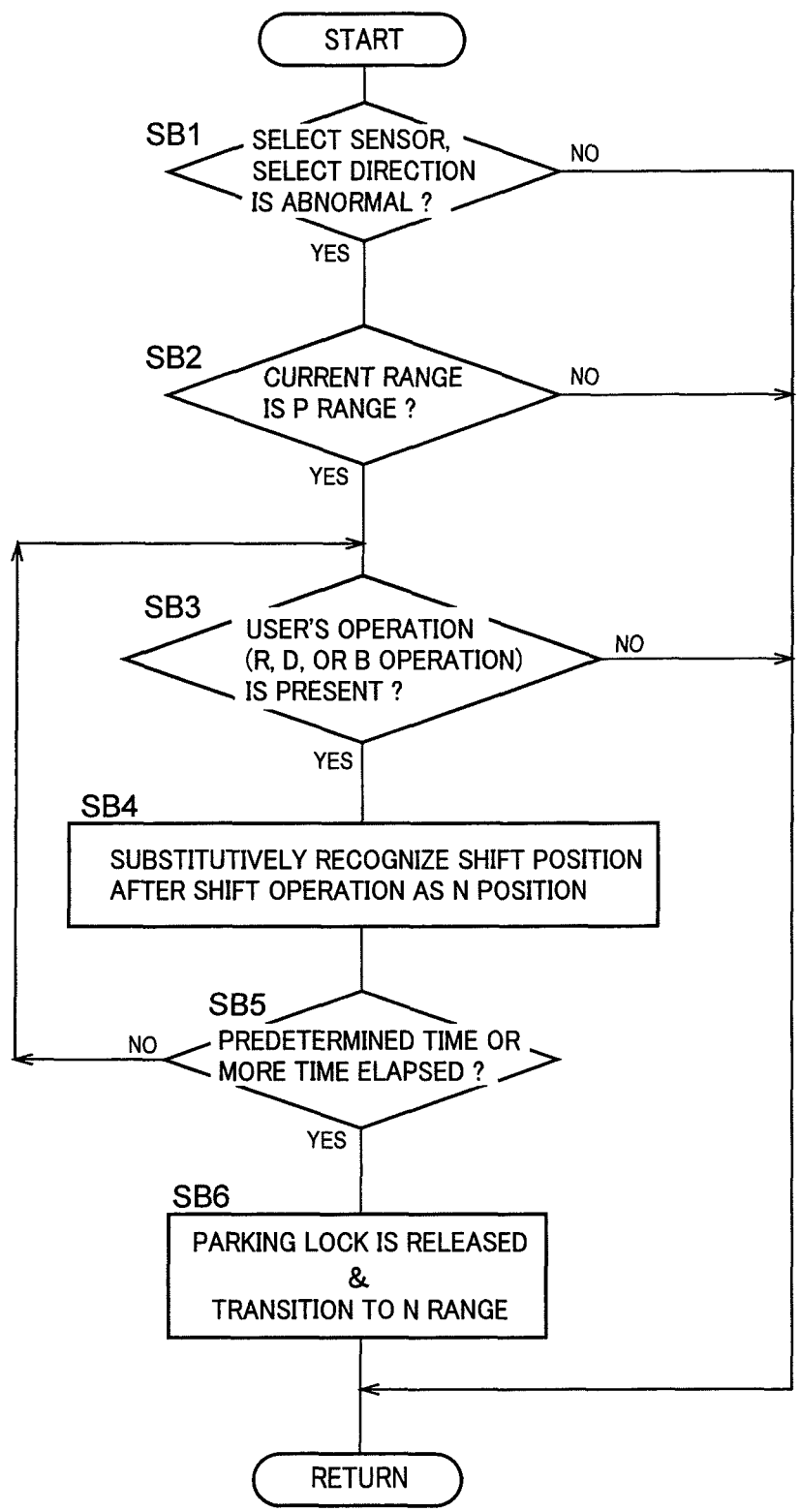
FIG. 15 is a flowchart for explaining main control actions of the electronic control device of FIG. 3, i.e., control actions of the second embodiment in an exemplary case of releasing the parking lock when one (the select sensor of FIG. 4) of the two position sensors for detecting the shift position becomes abnormal.

FIG. 15 is a flowchart for explaining main control actions of the electronic control device 40, i.e., control actions of this embodiment in an exemplary case of releasing the parking lock when one (select sensor 48) of the two position sensors detecting the shift position $P_{SH}$ becomes abnormal, the control actions being iteratively executed at a cycle time as extremely short as several msec to several tens of msec for example. The flowchart of FIG. 15 excludes SA3 from the flowchart of FIG. 11 of the first embodiment and the content of SB3 of FIG. 15 corresponding to SA4 of FIG. 11 differ from that of SA4 of FIG. 11, which are differences between the two flowcharts. SB1, SB2, SB4, SB5, and SB6 of FIG. 15 correspond to and have the same content as SA1, SA2, SA5, SA6, and SA7 of FIG. 11, respectively. Similar to FIG. 11, FIG. 15 depicts a flowchart in the case where the shift sensor 46 is normal but the select sensor 48 becomes abnormal.

At SB3 corresponding to the shift-operation determining means 124, it is determined based on a detection signal from the shift sensor 46 whether the shift operating device 42 is shift-operated by the driver or not (user). Specifically, it is determined based on a detection signal from the shift sensor 46 whether or not there occurs a change in the shift position $P_{SH}$ coinciding with the intentional operation pattern. As a result, if there occurs a change in the shift position $P_{SH}$ coinciding with the intentional operation pattern, then it is determined that the shift operating device 42 is shift-operated by the driver. If the determination at SB3 is affirmative, i.e., if there is a change in the shift position $P_{SH}$ coinciding with the intentional operation pattern, then the procedure goes to SB4. On the contrary, if the determination at SB3 is negative, then the flowchart of FIG. 15 ends.

In addition to the effects (A1), (A2), and (A4) to (A7) of the first embodiment, this embodiment has the following effect. According to this embodiment, the driver's shift operation of the shift operating device 42 is determined by determining whether or not there is a change in the shift position $P_{SH}$ coinciding with the intentional operation pattern without defining the pre-operation position $P_{LT}$ in advance, whereupon corresponding to shift operations by various types of drivers, determination can be made of whether the parking lock should be released or not.

Third Embodiment

A function block diagram of a third embodiment is similar to the function block diagram of FIG. 9 of the first embodiment. In the third embodiment, the abnormality detecting means 110 of the first embodiment is replaced by an abnormality detecting means 130; the vehicle movement prevention control means 118 of the first embodiment is replaced by a vehicle movement prevention control means 132; and the shift position determining means 120 of the first embodiment is replaced by a shift position determining means 134, with the other means being common to the two embodiments. Differences therebetween will chiefly be described hereinbelow.

The abnormality detecting means 130 of FIG. 9 has, in addition to the function of the abnormality detecting means 110 of the first embodiment, a function of determining, when the shift position detection means (the shift sensor 46 and/or the select sensor 48) having an abnormality detected recovers the normality, that the shift position detection means returns to normal. Specifically, when the detection signal voltage $V_{SF}$, $V_{SL}$ from the shift sensor 46 and/or the select sensor 48 as the position sensor determined to be abnormal returns to within the voltage variation range $RV_{SF}$, $RV_{SL}$ for some reason or other, the abnormality detecting means 130 makes a determination that the position sensor returns to normal.

The shift position determining means 134 is basically the same as the shift position determining means 120 of the first embodiment. Different from the shift position determining means 120, however, when the determination is made of the return to normal of the shift position detection means (the shift sensor 46 and/or the select sensor 48) determined to be abnormal by the abnormality detecting means 130 and all (the shift sensor 46 and the select sensor 48) of the shift position detection means comes to normally function, the shift position determining means 134 stops the possible substitutive recognition of the shift position $P_{SH}$ and recognizes intactly the actual shift position $P_{SH}$ detected by the shift position detection means (the shift sensor 46 and the select sensor 48). For example, in cases where the vehicle movement prevention determining means 112 determines that the vehicle movement is prevented (parking locked) by the parking lock mechanism 74 and where the abnormality detecting means 130 detects an abnormality in part of the shift position detection means, the shift position determining means 134 stops the substitutive recognition of the shift position $P_{SH}$ and recognizes intactly the actual shift position $P_{SH}$ detected by the shift position detection means (the shift sensor 46 and the select sensor 48) if the determination of returning to normal is made of the shift position detection means determined to be abnormal by the abnormality detecting means 130, before the elapse of the predetermined sensor on-fail range settling time time_f1 (predetermined time time_f1) from the time of the determination by the shift-operation determining means 114 that the shift operating device 42 is shift-operated by the driver, that is, before the release of the parking lock by the vehicle movement prevention control means 132 which will be described below.

The vehicle movement prevention control means 132 is basically the same as the vehicle movement prevention control means 118 of the first embodiment, but has a different function when the determination of returning to normal is made of the shift position detection means (the shift sensor 46 and/or the select sensor 48) determined to be abnormal by the abnormality detecting means 130. Specifically, in cases where the vehicle movement prevention determining means 112 determines that the vehicle movement is prevented (parking locked) by the parking lock mechanism 74 and where the abnormality detecting means 130 detects an abnormality in part of the shift position detection means, if the shift position determining means 134 recognizes intactly an actual shift position $P_{SH}$ detected by the shift position detection means (the shift sensor 46 and the select sensor 48) as described above, then the vehicle movement prevention control means 132 permits the parking lock mechanism 74 to release the parking lock, if the shift position $P_{SH}$ recognized by the shift position determining means 134 is the predetermined shift position $P_{SH}$ (specifically, R position, N position, or D position) to release the parking lock, allowing switching to a shift range corresponding to the recognized shift position $P_{SH}$ after the shift operation. To sum up, in a case where an abnormality is detected in the shift sensor 46 or the select sensor 48 with the parking lock effected, if the shift sensor 46 or the select sensor 48 determined to be abnormal by the abnormality detecting means 130 returns to normal before the elapse of the predetermined sensor on-fail range settling time time_f1 (predetermined time time_f1) from the time of the determination by the shift-operation determining means 114 that the shift operating device 42 is shift-operated by the driver, then the vehicle movement prevention control means 132 permits the parking lock mechanism 74 to release the parking lock, if the shift position $P_{SH}$ detected by the shift sensor 46 and the select sensor 48 is the predetermined shift position $P_{SH}$ (specifically, R position, N position, or D position) to release the parking lock, allowing switching to a shift range corresponding to the recognized shift position $P_{SH}$ after the shift operation. To briefly represent, if the shift sensor 46 or the select sensor 48 having an abnormality detected when in P range returns to normal before feeding the NP output (parking lock release command) to the parking lock mechanism 74, then the vehicle movement prevention control means 132 performs the release of the parking lock and the switching of the shift range in the same conditions as in the case where the two position sensors 46 and 48 are both normal, i.e., if the shift position $P_{SH}$ detected from the two position sensors 46 and 48 is R position, N position, or D position, then it feeds the NP output to the parking lock mechanism 74 to release the parking lock and switch from P range to a shift range corresponding to the shift position $P_{SH}$.

Figure 16:
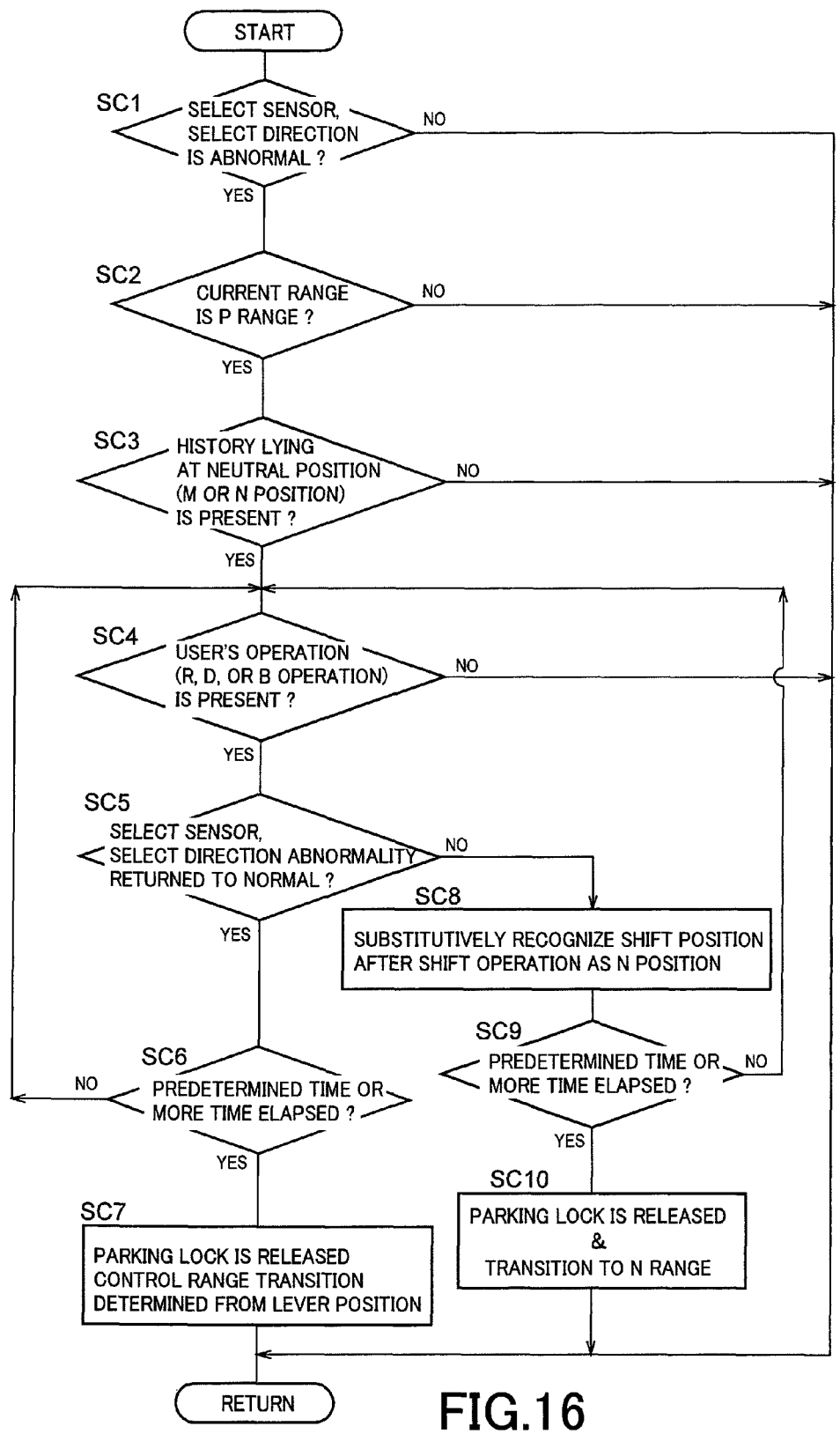
FIG. 16 is a flowchart for explaining main control actions of the electronic control device of FIG. 3, i.e., control actions of the third embodiment in an exemplary case of releasing the parking lock when one (the select sensor of FIG. 4) of the two position sensors for detecting the shift position becomes abnormal.

FIG. 16 is a flowchart for explaining main control actions of the electronic control device 40, i.e., control actions of this embodiment in an exemplary case where the parking lock is released when one (the select sensor 48) of the two position sensors for detecting the shift position $P_{SH}$ becomes abnormal, that are iteratively executed at a cycle time as extremely short as several msec to several tens of msec for example. SC1, SC2, SC3, SC4, SC8, SC9, and SC10 of FIG. 16 correspond to and have the same content as SA1, SA2, SA3, SA4, SA5, SA6, and SA7 of FIG. 11, respectively. The flowchart of FIG. 16 differs from the flowchart of FIG. 11 of the first embodiment in that it has additional SC5 to SC7. The differences therebetween will chiefly be described below. Similar to FIG. 11, FIG. 16 depicts the flowchart in a case where the shift sensor 46 is normal but the select sensor 48 becomes abnormal.

Referring to FIG. 16, if determination at SC4 is affirmative, then the procedure goes to SC5 corresponding to the abnormality detecting means 130, at which it is determined whether the select sensor 48 determined to be abnormal at SC1 returns to normal or not. Specifically, if the detection signal voltage $V_{SL}$ from the select sensor 48 returns to within the voltage variation range $RV_{SL}$ for some reason or other, then a determination is made that the select sensor 48 returns to normal. If the determination at SC5 is affirmative, i.e., if the select sensor 48 returns to normal, then the procedure goes to SC6. On the contrary, if the determination at SC5 is negative, then the procedure goes to SC8.

At SC6 corresponding to the vehicle movement prevention control means 132, a determination is made of whether or not a predetermined time or more has elapsed continuously from the time when the shift operating device 42 is shift-operated by the driver (i.e., when the determination at SC4 is affirmed). At SC6, the predetermined time is the range settling time (shift operation settling time) when the sensor is normal and is set to e.g., "100 ms" for B position, R position, and D position and "500 ms" for N position as described above. However, it may be the same as the predetermined sensor on-fail range settling time time_f1 that is used at SC9 of FIG. 16 corresponding to SA6 of FIG. 11 (the first embodiment). If the determination at SC6 is affirmative, i.e., if the predetermined time or more has elapsed continuously from the time of the driver's shift-operation of the shift operating device 42, then the procedure goes to SC7. On the contrary, if the determination at SC6 is negative, then the procedure goes to SC4.

At SC7 corresponding to the vehicle movement prevention control means 132, the release of the parking lock and the switching of the shift range are performed under the same conditions as the case where the shift sensor 46 and the select sensor 48 are normal. That is, if the shift position $P_{SH}$ detected by the two position sensors 46 and 48 after the shift operation, i.e., the shift position $P_{SH}$ determined from the actual position of the shift lever 44 is R position, N position, or D position, then the NP output (parking lock release command) is fed to the parking lock mechanism 74 so that the parking lock mechanism 74 release the parking lock, allowing the shift range (vehicle control range) to transition from P range to a shift range corresponding to the shift position $P_{SH}$ detected by the two position sensors 46 and 48. Furthermore, at SC7, after the NP output is fed to the parking lock mechanism 74, the history is erased of lying at the first-direction second position P1_2 that is affirmed at SC3, switching to "select sensor fail-safe enabling flag xslctflsfen=OFF".

In addition to the effects (A1) to (A7) of the first embodiment, this embodiment has the following effects. According to this embodiment, when the shift position detection means (the shift sensor 46 and/or the select sensor 48) having an abnormality detected returns to normal, the abnormality detecting means 130 makes a determination of the return to normal of the failed shift position detection means. Then, when the determination is made of the return to normal of the shift position detection means (the shift sensor 46 and/or the select sensor 48) determined to be abnormal by the abnormality detecting means 130 and all (the shift sensor 46 and the select sensor 48) of the shift position detection means comes to normally function, the shift position determining means 134 stops the possible substitutive recognition of the shift position $P_{SH}$ and recognizes intactly the actual shift position $P_{SH}$ detected by the shift position detection means (the shift sensor 46 and the select sensor 48). In addition, the vehicle movement prevention control means 132 makes switching to a shift range corresponding to the shift position $P_{SH}$ after the shift operation recognized by the shift position determining means 134. Thus, even when the shift sensor 46 and/or the select sensor 48 temporarily becomes abnormal, if it returns to normal before the switching of the shift range, the shift range can be switched in the same manner as when the two position sensors 46 and 48 are normal, thus enabling the running along the driver's intention.

According to this embodiment, in cases where the parking lock is made and where an abnormality is detected in the shift sensor 46 or the select sensor 48, when the shift sensor 46 or the select sensor 48 determined to be abnormal by the abnormality detecting means 130 returns to normal before the elapse of the predetermined sensor on-fail range settling time time_f1 (the predetermined time time_f1) from the time of the determination by the shift-operation determining means 114 of the shift operating device 42 being shift-operated by the driver, the vehicle movement prevention control means 132 permits the parking lock mechanism 74 to release the parking lock if the shift position $P_{SH}$ detected by the shift sensor 46 and the select sensor 48 is the predetermined shift position $P_{SH}$ (specifically, R position, N position, or D position) to release the parking lock. Thus, the vehicle movement prevention (parking lock) can be released in accordance with the driver's intention when the shift sensor 46 or the select sensor 48 in fail returns to normal.

Fourth Embodiment

A function block diagram of a fourth embodiment is similar to the function block diagram of FIG. 9 of the first embodiment. In the fourth embodiment, the abnormality detecting means 110 of the first embodiment is replaced by the abnormality detecting means 130 of the third embodiment; the vehicle movement prevention control means 118 of the first embodiment is replaced by a vehicle movement prevention control means 140; and the shift position determining means 120 of the first embodiment is replaced by the shift position determining means 134 of the third embodiment, with the other means being common to the first embodiment and the fourth embodiment. Differences of the fourth embodiment from the first embodiment and the third embodiment will chiefly be described hereinbelow.

In FIG. 9, the vehicle movement prevention control means 140 is basically the same as the vehicle movement prevention control means 118 of the first embodiment, but has a different function when the determination of returning to normal is made of the shift position detection means (the shift sensor 46 and/or the select sensor 48) determined to be abnormal by the abnormality detecting means 130. Specifically, in cases where the vehicle movement prevention determining means 112 determines that the vehicle movement is prevented (parking locked) by the parking lock mechanism 74 and where the abnormality detecting means 130 detects an abnormality in part of the shift position detection means, if the shift sensor 46 or the select sensor 48 determined to be abnormal by the abnormality detecting means 130 returns to normal before the elapse of the predetermined sensor on-fail range settling time time_f1 (predetermined time time_f1) from the time of the determination by the shift-operation determining means 114 of the shift operating device 42 being shift-operated by the driver, then the vehicle movement prevention control means 140 does not permit the parking lock mechanism 74 to release the parking lock until the shift operating device 42 is again shift-operated by the driver. Since, at that time, the shift sensor 46 and the select sensor 48 normally function, the vehicle movement prevention control means 140 determines based on detection signals from the two position sensors 46 and 48 whether the shift operating device 42 is again shift-operated by the driver or not.

To inversely represent, the vehicle movement prevention control means 140 does not prohibit the release of the parking lock as long as the shift operating device 42 is again shift-operated by the driver after the return to normal of the shift sensor 46 or the select sensor 48 determined to be abnormal, with the result that switching of the shift range is carried out in the same manner as when the shift sensor 46 and the select sensor 48 are normal. That is, if the shift position $P_{SH}$ after the driver's shift operation is R position, N position, or D position, then the parking lock is released to switch the shift range from P range to a shift range corresponding to the shift position $P_{SH}$.

Figure 17:
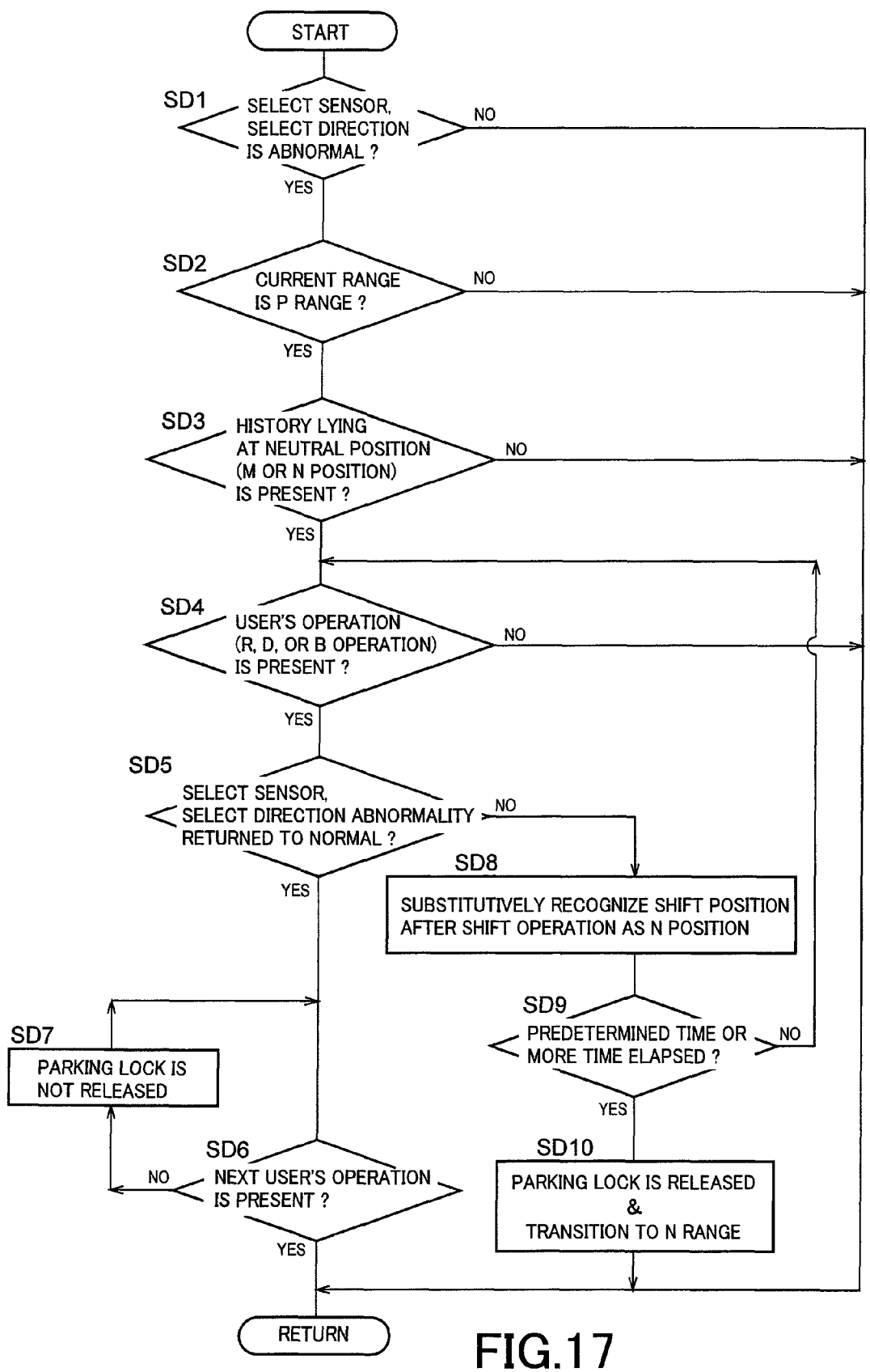
FIG. 17 is a flowchart for explaining main control actions of the electronic control device of FIG. 3, i.e., control actions of the fourth embodiment in an exemplary case of releasing the parking lock when one (the select sensor of FIG. 4) of the two position sensors for detecting the shift position becomes abnormal.

FIG. 17 is a flowchart for explaining main control actions of the electronic control device 40, i.e., control actions of this embodiment in an exemplary case where the parking lock is released when one (the select sensor 48) of the two position sensors for detecting the shift position $P_{SH}$ becomes abnormal, that are iteratively executed at a cycle time as extremely short as several msec to several tens of msec for example. SD1, SD2, SD3, SD4, SD8, SD9, and SD10 of FIG. 17 correspond to and have the same content as SA1, SA2, SA3, SA4, SA5, SA6, and SA7 of FIG. 11, respectively. SD5 of FIG. 17 corresponds to and has the same content as SC5 of FIG. 16. SD6 and SD7 of FIG. 17 will mainly be described below that are not included in FIGS. 11 and 16 to make up differences therefrom. Similar to FIG. 11, FIG. 17 depicts the flowchart when the shift sensor 46 is normal but the select sensor 48 goes abnormal.

If the determination at SD5 of FIG. 17 is affirmative, then the procedure proceeds to SD6. At SD6 corresponding to the vehicle movement prevention control means 140, it is determined whether the shift operating device 42 is again shift-operated by the driver or not (user) after the shift operation determined at SD4. Since both the shift sensor 46 and the select sensor 48 normally function at the execution of SD6, a determination is made of whether the shift operating device 42 is again shift-operated by the driver or not, based on detection signals from the two position sensors 46 and 48. If the determination at SD6 is affirmative, i.e., if the shift operating device 42 is again shift-operated by the driver, then the flowchart of FIG. 17 ends. On the contrary, if the determination at SD6 is negative, then the procedure goes to SD7.

At SD7 corresponding to the vehicle movement prevention control means 140, P range goes on so that the parking lock is not released. The procedure then goes from SD7 back to SD6.

In addition to the effects (A1) to (A7) of the first embodiment, this embodiment further has the following effects. According to this embodiment, in cases where the vehicle movement prevention determining means 112 determines that the vehicle movement is prevented (parking locked) by the parking lock mechanism 74 and where the abnormality detecting means 130 detects an abnormality in part of the shift position detection means, if the shift sensor 46 or the select sensor 48 determined to be abnormal by the abnormality detecting means 130 returns to normal before the elapse of the predetermined sensor on-fail range settling time time_f1 (predetermined time time_f1) from the time of the determination by the shift-operation determining means 114 of the shift operating device 42 being shift-operated by the driver, then the vehicle movement prevention control means 140 does not permit the parking lock mechanism 74 to release the parking lock until the shift operating device 42 is again shift-operated by the driver. Thus, the parking lock mechanism 74 can work not based on the shift operation performed when the shift position detection means (the shift sensor 46 or the select sensor 48) is abnormal, but based on the shift operation performed after its returning to normal, thereby achieving a release of the parking lock along the driver's intention more faithfully.

Although the embodiments of the present invention have hereinbefore been described in detail with reference to the drawings, they are merely one exemplary embodiments, they can naturally be carried out in variously altered or modified forms based on the knowledge of those skilled in the art.

For example, in the embodiments, the shift-operation determining means 114 may make a determination of whether the shift operating device 42 is shift-operated by the driver or not when the abnormality detecting means 110, 130 detects an abnormality in part (the shift sensor 46 or the select sensor 48) of the shift position detection means.

Although, in the embodiments, the shift position $P_{SH}$ in the shift operating device 42 returns to M position the moment the driver releases the shift lever 44, the present invention is not exclusively applied to such a shift operating device 42.

Although, in the embodiments, the shift operating device 42 is shift-operated two-dimensionally, it may be shift-operated along one axis or may be shift-operated three-dimensionally.

Although, in the embodiments, the shift operating device 42 is provided with the shift sensor 46 and the select sensor 48 as the position sensors for detecting the position of the shift lever 44, the number of the position sensors is not limited to two.

Although the shift operating device 42 of the embodiments is provided with the shift lever 44 that is shift-operated to a plurality of different shift positions $P_{SH}$, the shift lever 44 may be replaced by a push-button switch, a slide switch, etc. so that the shift range is switched through the operation thereof. In addition, the shift operation of the shift operating device 42 is not limited to the manual operation, but it may be made with the foot or in response to the driver's voice.

Although, in the embodiments, the shift operating device 42 is disposed on the instrument panel, it may be disposed at any position since no limitation is imposed on the position to dispose it.

Although, in the embodiments, the parking lock mechanically stopping the rotation of the drive wheels 38 by the parking lock mechanism 74 is described as an exemplary method of preventing the vehicle movement, the method of preventing the vehicle moment is not limited thereto but it may be achieved by activating the electromotive parking brake fitted to the drive wheels for example.

Although, in the embodiments, the shift operating device 42 is operated for a selection of the shift range by the driver, its use is not limited to the selection of the shift range. Therefore, the present invention may be applied for example to a sensor abnormality (abnormality in an operational position detecting means) of a parking brake operating device operated by the driver to activate the parking brake.

In the flowcharts (FIGS. 11, 15, 16, and 17) of the embodiments, the control actions may not include SA5 of FIG. 11, SB4 of FIG. 15, SC8 of FIG. 16, and SD8 of FIG. 17.

In the flowcharts (FIGS. 11, 15, 16, and 17) of the embodiments, the control actions may not include SA6 of FIG. 11, SB5 of FIG. 15, SC9 of FIG. 16, and SD9 of FIG. 17.

Although, in the embodiments, the vehicle movement prevention control means 118, 132, 140 permits the parking lock mechanism 74 to release the parking lock if the shift-operation determining means 114, 124 determines that the shift operating device 42 is shift-operated by the driver and if the other conditions are also satisfied, there may be a case where the parking lock is not permitted to be released, depending on the shift position $P_{SH}$ after the driver's shift operation. For example, the vehicle movement prevention control means 118, 132, 140 may permit the parking lock mechanism 74 to release the parking lock if the shift-operation determining means 114, 124 determines that the shift operating device 42 is shift-operated by the driver to a predetermined parking lock release position and if the other conditions are also satisfied. Such a configuration is advantageous to the case for example where the shift operating device 42 has shift positions not at all including the predetermined shift position $P_{SH}$ (specifically, R position, N position, or D position) to release the parking lock as the position other than the pre-operation position $P_{LT}$.

Although the power transmission device 10 of the embodiments is conveniently used in the FF type vehicle in which the engine 8 is transversely placed, it may be used in an FR type vehicle or a vehicle having the engine 8 that is vertically placed therein.

The power transmission device 10 of the embodiments may be provided with a stepped transmission or a CVT.

The plurality of embodiments may be implemented in mutually combined forms by setting a priority order for example.

Although not exemplified one by one, the present invention may be carried out in variously altered forms without departing from the spirit thereof.

EXPLANATIONS OF REFERENCE NUMERALS

38: drive wheel
40: electronic control device (controller)
42: shift operating device
46: shift sensor (shift position detection means, first-direction detection means)
48: select sensor (shift position detection means, second-direction detection means)
74: parking lock mechanism (actuator)
110, 130: abnormality detecting means
114, 124: shift-operation determining means
118, 132, 140: vehicle movement prevention control means

The invention claimed is:

1. A vehicle control device having an actuator operative to prevent a movement of a vehicle and a shift operating device including a shift position detection means detecting a shift position, the vehicle control device outputting, when the shift operating device is shift-operated to a predetermined shift position to release prevention of the movement of the vehicle, a control signal for permitting the actuator to release the prevention of the movement of the vehicle, the vehicle control device comprising:
   an abnormality detecting means that detects an abnormality in at least part of the shift position detection means;
   a shift-operation determining means that determines, based on a detection signal from the shift position detection means, whether the shift operating device is shift-operated or not by a driver; and
   a vehicle movement prevention control means that, in a case where the movement of the vehicle is prevented by the actuator and in a case where the abnormality in part of the shift position detection means is detected by the abnormality detecting means, permits the actuator to release the prevention of the movement of the vehicle if it is determined by the shift-operation determining means that the shift operating device is shift-operated by the driver,
   the shift-operation determining means determining that the shift operating device is shift-operated by the driver if the shift position changes from a predefined pre-operation position to a position other than the pre-operation position after the abnormality in part of the shift position detection means is detected by the abnormality detecting means, wherein
   in a case where all of the shift position detection means is normal, if a stay time at the shift position for a neutral range reaches or exceeds a predetermined neutral range settling time, then switching being made to the neutral range,
   the vehicle movement prevention control means permitting the actuator to release the prevention of the movement of the vehicle if a predetermined time shorter than the predetermined neutral range settling time has elapsed from a time when the shift operating device is shift-operated by the driver, and
   in a case where the shift position detection means determined to be abnormal by the abnormality detecting means returns to normal before the elapse of the predetermined time from the time when the shift operating device is shift-operated by the driver, the vehicle movement prevention control means permitting the actuator to release the prevention of the movement of the vehicle if the shift position detected by the shift position detection means is a predetermined shift position to release the prevention of the movement of the vehicle.

2. The vehicle control device of claim 1, wherein the actuator is a parking lock mechanism that mechanically stops rotation of drive wheels.

3. A vehicle control device having an actuator operative to prevent a movement of a vehicle and a shift operating device including a shift position detection means detecting a shift position, the vehicle control device outputting, when the shift operating device is shift-operated to a predetermined shift position to release prevention of the movement of the vehicle, a control signal for permitting the actuator to release the prevention of the movement of the vehicle, the vehicle control device comprising:
   an abnormality detecting means that detects an abnormality in at least part of the shift position detection means;

a shift-operation determining means that determines, based on a detection signal from the shift position detection means, whether the shift operating device is shift-operated or not by a driver; and a vehicle movement prevention control means that, in a case where the movement of the vehicle is prevented by the actuator and in a case where the abnormality in part of the shift position detection means is detected by the abnormality detecting means, permits the actuator to release the prevention of the movement of the vehicle if it is determined by the shift-operation determining means that the shift operating device is shift-operated by the driver, the shift-operation determining means determining that the shift operating device is shift-operated by the driver if the shift position changes from a predefined pre-operation position to a position other than the pre-operation position after the abnormality in part of the shift position detection means is detected by the abnormality detecting means, wherein in a case where all of the shift position detection means is normal, if a stay time at the shift position for a neutral range reaches or exceeds a predetermined neutral range settling time, then switching being made to the neutral range, and the vehicle movement prevention control means permitting the actuator to release the prevention of the movement of the vehicle if a predetermined time shorter than the predetermined neutral range settling time has elapsed from a time when the shift operating device is shift-operated by the driver.

4. The vehicle control device of claim 3, wherein in a case where the shift position detection means determined to be abnormal by the abnormality detecting means returns to normal before elapse of the predetermined time from the time when the shift operating device is shift-operated by the driver, the vehicle movement prevention control means not permitting the actuator to release the prevention of the movement of the vehicle until the shift operating device is again shift-operated by the driver.

5. A vehicle control device having an actuator operative to prevent a movement of a vehicle and a shift operating device including a shift position detection means detecting a shift position, the vehicle control device outputting, when the shift operating device is shift-operated to a predetermined shift position to release prevention of the movement of the vehicle, a control signal for permitting the actuator to release the prevention of the movement of the vehicle, the vehicle control device comprising:

an abnormality detecting means that detects an abnormality in at least part of the shift position detection means;

a shift-operation determining means that determines, based on a detection signal from the shift position detection means, whether the shift operating device is shift-operated or not by a driver; and a vehicle movement prevention control means that, in a case where the movement of the vehicle is prevented by the actuator and in a case where the abnormality in part of the shift position detection means is detected by the abnormality detecting means, permits the actuator to release the prevention of the movement of the vehicle if it is determined by the shift-operation determining means that the shift operating device is shift-operated by the driver, the shift-operation determining means determining that the shift operating device is shift-operated by the driver if the shift position changes from a predefined pre-operation position to a position other than the pre-operation position after the abnormality in part of the shift position detection means is detected by the abnormality detecting means, the shift operating device is two-dimensionally shift-operated in a first direction and a second direction intersecting with the first direction, the shift position detection means includes a first-direction detection means that detects a shift operation in the first direction and a second-direction detection means that detects a shift operation in the second direction, the case where an abnormality in part of the shift position detection means is detected by the abnormality detecting means refers to a case where an abnormality in either one of the first-direction detection means and the second-direction detection means is detected by the abnormality detecting means, the shift-operation determining means determining whether the shift operating device is shift-operated by the driver or not, based on a detection signal from the other that is not abnormal of the first-direction detection means and the second-direction detection means, the first-direction detection means and the second-direction detection means being position sensors, respectively, for detecting the shift position, and the abnormality detecting means determining that the first-direction detection means and the second-direction detection means are respectively abnormal if voltages of their respective detection signals fall outside their respective predefined voltage variation ranges.

* * * * *